US011303610B2

(12) United States Patent
Kamdar et al.

(10) Patent No.: US 11,303,610 B2
(45) Date of Patent: Apr. 12, 2022

(54) SYSTEMS AND METHODS FOR MANAGING DOMAIN NAMES IN A PLURALITY OF COMPUTERIZED DEVICES COMMUNICATING OVER A COMMUNICATION NETWORK

(71) Applicant: Go Daddy Operating Company, LLC, Scottsdale, AZ (US)

(72) Inventors: Tapan Kamdar, San Jose, CA (US); Garrett Matsudaira, Bellevue, WA (US); Nitin Gupta, Mountain View, CA (US); Edward J. Karcher, III, Chandler, AZ (US); Andrew Burgess, Seattle, WA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

(21) Appl. No.: 16/850,794

(22) Filed: Apr. 16, 2020

(65) Prior Publication Data

US 2021/0328968 A1 Oct. 21, 2021

Related U.S. Application Data

(63) Continuation of application No. 15/074,823, filed on Mar. 18, 2016, now abandoned, which is a continuation-in-part of application No. 14/625,523, filed on Feb. 18, 2015, now Pat. No. 9,972,041.

(51) Int. Cl.

*H04L 29/12* (2006.01)
*G06F 16/9535* (2019.01)
*G06F 16/242* (2019.01)
*H04L 61/3015* (2022.01)
*H04L 61/4511* (2022.01)

(52) U.S. Cl.
CPC ...... *H04L 61/3025* (2013.01); *G06F 16/2423* (2019.01); *G06F 16/9535* (2019.01); *H04L 61/1511* (2013.01)

(58) Field of Classification Search
CPC ............ H04L 61/3025; H04L 61/1511; G06F 16/9535; G06F 16/2423
See application file for complete search history.

(56) References Cited

U.S. PATENT DOCUMENTS

2010/0287033 A1* 11/2010 Mathur .............. G06F 16/9535 705/319
2014/0143331 A1* 5/2014 Smith .............. H04L 29/12641 709/204

(Continued)

*Primary Examiner* — Backhean Tiv
*Assistant Examiner* — Jihad K Boustany
(74) *Attorney, Agent, or Firm* — Greenberg Traurig, LLP

(57) ABSTRACT

Systems and methods of the present invention provide for servers generating a suggested domain name from a requested domain name via a modification using a variation algorithm using a first variation technique in a plurality of variation techniques. The server(s) render a user feedback interface including the suggested domain name and a first and second user interface control encoding a positive and negative response to the variation technique respectively. After decoding a response, the server(s) generate a user interface allowing the user to review which of the suggested domain names have been liked or added to a favorites list by other users.

18 Claims, 16 Drawing Sheets

File Edit Tools

Domain Name Control Panel

Your Location: Phoenix, AZ

Search a Domain Name: phoenixbicycles.com Search

Sorry, phoenixbicycles.com is not available. However, based on identified keywords in your requested domain name, your requested top level domain (TLD), your location, and comparable price points, we can recommend the following alternative domain names:

| Domain: | Price: | Domain Variation Technique Used: |
| --- | --- | --- |
| phoenixbicycle.co | $14.99 | Replace TLD (.com with .co) |
| phoenixbicycle.us | $9.99 | Replace TLD with ccTLD (.com with .us) |
| phoenixcycles.com | $14.99 | Replace token, synonym ("bicycle" with "cycle") |
| phoenixbicyclesarizona.com | $14.99 | Additional token, geographic token ("Arizona") |
| phoenix.bicycles | $14.99 | Replace TLD with specialized TLD (.com with .bicycles) |
| phoenixbicycles.arizona | $14.99 | Replace TLD with specialized geographic TLD (.com with .arizona) |

Provide Feedback for Suggested Domain Names

Register Domain Names
Add Domain Names to Cart/Favorites

(56) References Cited

U.S. PATENT DOCUMENTS

| | | | | |
|---|---|---|---|---|
| 2016/0179769 | A1* | 6/2016 | Gershom | G06F 16/958 715/235 |
| 2018/0212926 | A1* | 7/2018 | Cholleton | H04L 61/302 |
| 2018/0309720 | A1* | 10/2018 | Cochran | H04L 61/3025 |
| 2019/0068550 | A1* | 2/2019 | Sheth | H04L 29/12641 |

* cited by examiner

File Edit Tools

Domain Name Control Panel

Your Location: Phoenix, AZ

Search a Domain Name: phoenixbicycles.com Search

Sorry, phoenixbicycles.com is not available. However, based on identified keywords in your requested domain name, your requested top level domain (TLD), your location, and comparable price points, we can recommend the following alternative domain names:

| Domain: | Price: | Domain Variation Technique Used: |
|---|---|---|
| ☐ phoenixbicycle.co | $14.99 | Replace TLD (.com with .co) |
| ☐ phoenixbicycle.us | $9.99 | Replace TLD with ccTLD (.com with .us) |
| ☐ phoenixcycles.com | $14.99 | Replace token, synonym ("bicycle" with "cycle") |
| ☐ phoenixbicyclesarizona.com | $14.99 | Additional token, geographic token ("Arizona") |
| ☐ phoenix.bicycles | $14.99 | Replace TLD with specialized TLD (.com with .bicycles) |
| ☐ phoenixbicycles.arizona | $14.99 | Replace TLD with specialized geographic TLD (.com with .arizona) |

Provide Feedback for Suggested Domain Names ▽

Register Domain Names
Add Domain Names to Cart/Favorites

FIG. 10

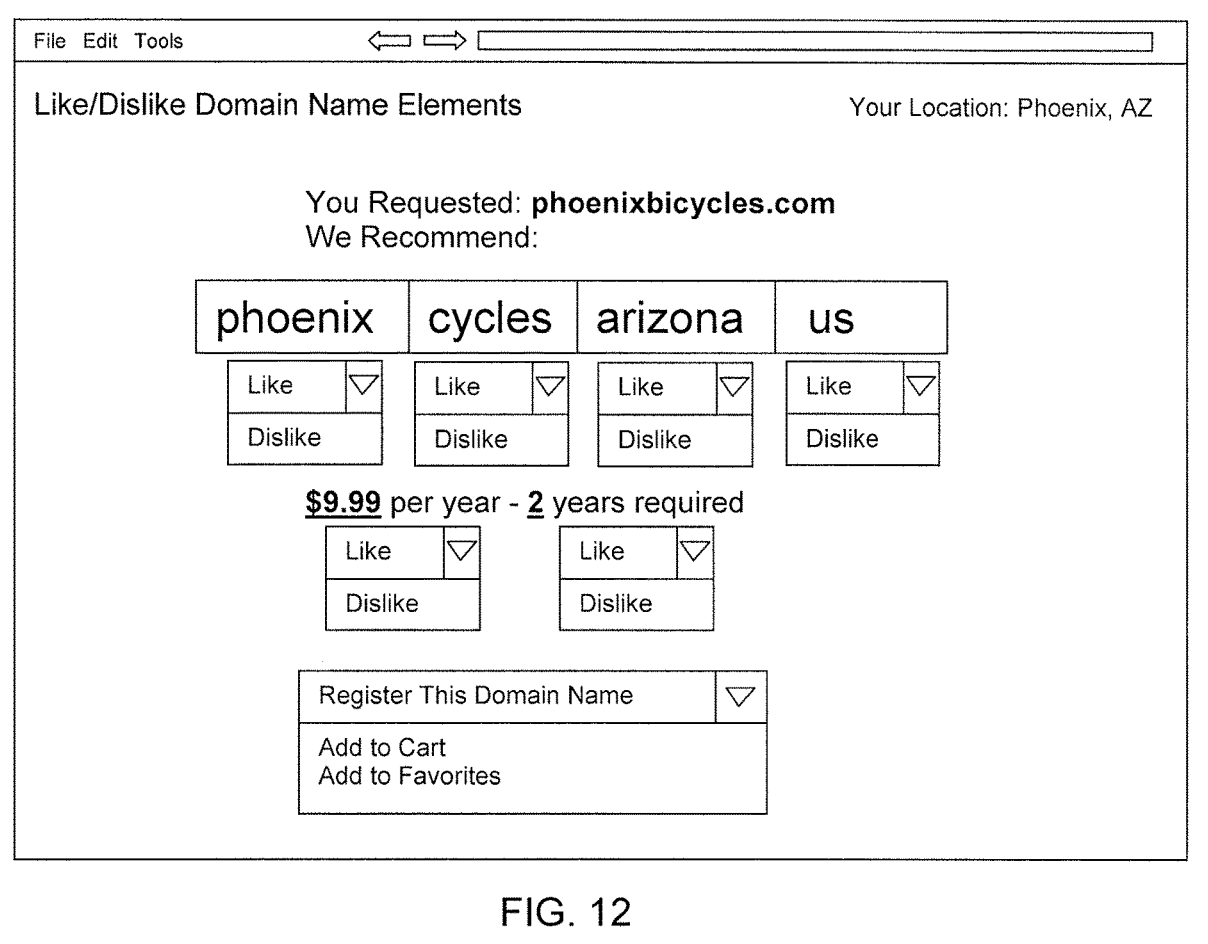

File Edit Tools

Like/Dislike Domain Name Elements

Your Location: Phoenix, AZ

You Requested: phoenixbicycles.com
We Recommend:

| phoenix | cycles | arizona | us |
|---|---|---|---|
| Like / Dislike | Like / Dislike | Like / Dislike | Like / Dislike |

$9.99 per year - 2 years required

Like / Dislike — Like / Dislike

Register This Domain Name
Add to Cart
Add to Favorites

FIG. 12

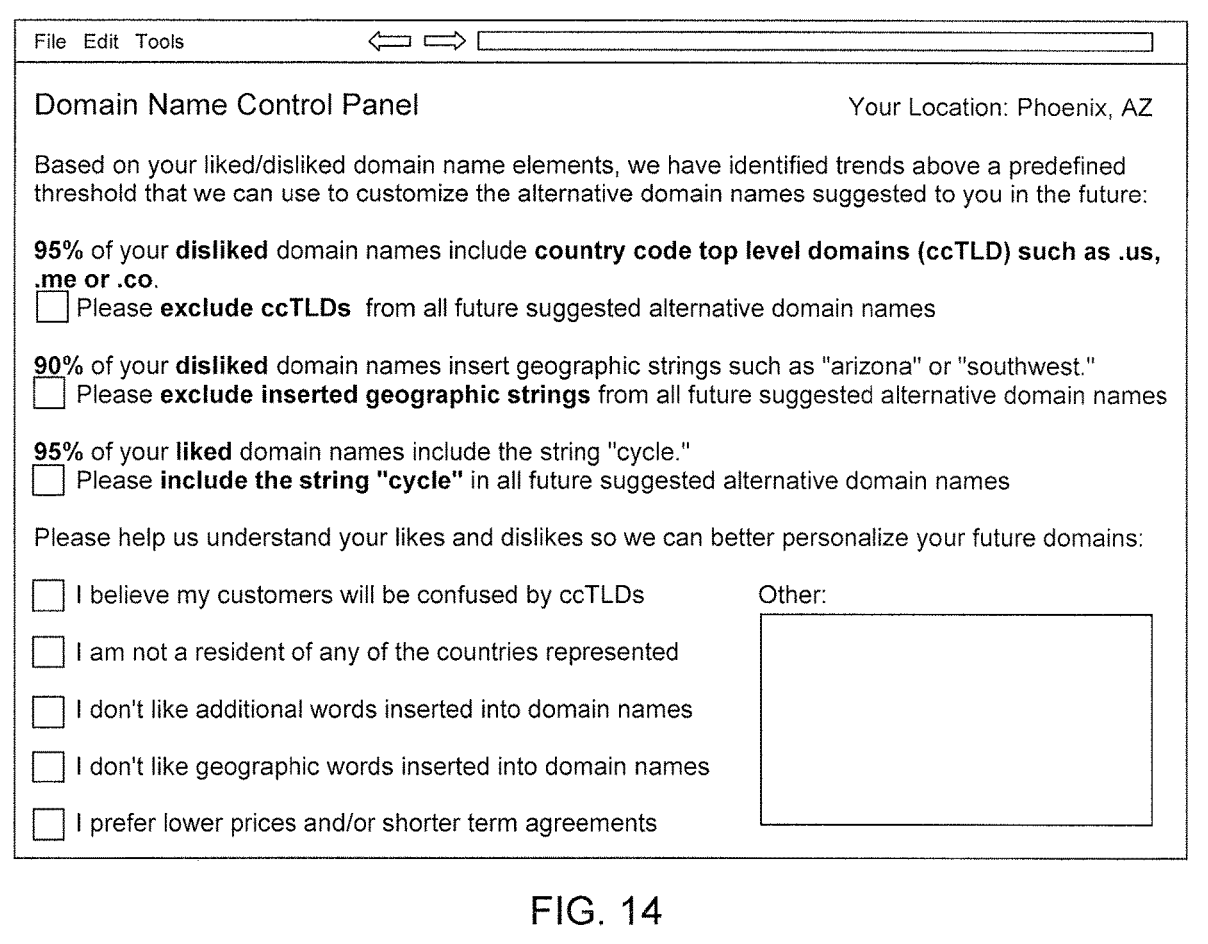

File Edit Tools

Domain Name Control Panel

Your Location: Phoenix, AZ

Based on your liked/disliked domain name elements, we have identified trends above a predefined threshold that we can use to customize the alternative domain names suggested to you in the future:

95% of your disliked domain names include country code top level domains (ccTLD) such as .us, .me or .co.

☐ Please exclude ccTLDs from all future suggested alternative domain names

90% of your disliked domain names insert geographic strings such as "arizona" or "southwest."

☐ Please exclude inserted geographic strings from all future suggested alternative domain names

95% of your liked domain names include the string "cycle."

☐ Please include the string "cycle" in all future suggested alternative domain names Please help us understand your likes and dislikes so we can better personalize your future domains:

☐ I believe my customers will be confused by ccTLDs

☐ I am not a resident of any of the countries represented

☐ I don't like additional words inserted into domain names

☐ I don't like geographic words inserted into domain names

☐ I prefer lower prices and/or shorter term agreements

Other:

FIG. 14

File Edit Tools

Domain Name Control Panel

Logged in as: WebDev1

| Recommended Domain Names: | Likes: | Favorites: | Searches: |
|---|---|---|---|
| phoenixbicycles.com | 95 | 80 | 5 |
| phoenixcycles.com | 76 | 50 | 3 |
| phoenix.bicycles | 62 | 25 | 3 |
| pheenixbicicles.com | 0 | 0 | 1 |
| **AZ Domain Name Trends**: | | | |
| domainname1arizona | 100 | 90 | 50 |
| domainname2arizona | 95 | 85 | 45 |
| domainname3arizona | 90 | 80 | 40 |
| **Demographic Domain Name Trends**: | | | |
| domainname1webdev | 100 | 90 | 50 |
| domainname2webdev | 95 | 85 | 45 |
| domainname3webdev | 90 | 80 | 40 |
| domainname4webdev | 85 | 75 | 30 |

Actions:

Register
Cart
Like
Favorite

Register
Cart
Like
Favorite

Register
Cart
Like
Favorite

Sales/Package Deals:

You have explicitly disliked suggested/recommended domains based on prices over $19.99. However, several of those domain names are currently on sale, or available as package deals.

☐ Show me recommended domain names in my preferred price range

FIG. 16

SYSTEMS AND METHODS FOR MANAGING DOMAIN NAMES IN A PLURALITY OF COMPUTERIZED DEVICES COMMUNICATING OVER A COMMUNICATION NETWORK

CROSS-REFERENCE TO RELATED APPLICATIONS

This application is a continuation-in-part of U.S. patent application Ser. No. 14/625,523, filed Feb. 18, 2015, and entitled "EARMARKING A SHORT LIST OF FAVORITE DOMAIN NAMES OR SEARCHES."

FIELD OF THE INVENTION

The present invention generally relates to the field of computing networks, and more generally to systems and methods for managing domain names in a plurality of computerized devices communicating over a communication network.

SUMMARY OF THE INVENTION

The present invention provides systems and methods comprising: a repository of favorite domain name data and at least one client computer communicatively coupled to the network and configured to: receive at least one selection of at least one favorite domain name via at least one user interface control associated with a list of suggested available domain names displayed during a domain name search session; access the repository of favorite domain name data; and display a list of favorite domain names. The present invention may also comprise a server computer communicatively coupled to a network and configured to: generate the list of suggested available domain names; receive, from the at least one client computer, the at least one selection; synchronize the repository of favorite domain name data with at least one local favorite domain name data on the at least one client computer; and identify, via machine learning, at least one aggregate or individual trend within the repository of domain name data.

In other embodiments, the present invention also provides systems and methods comprising one or more servers generating a suggested domain name from a requested domain name via a modification to the requested domain name using a variation algorithm using a first variation technique in a plurality of variation techniques. The server(s) render a user feedback interface including the suggested domain name and a first and second user interface control encoding a positive and negative response to the variation technique respectively. After decoding a response, the server(s) generate a second suggested domain name, either using the first variation technique for the positive response, or a second variation technique, in the plurality of variation techniques that do not include the first variation technique, for a negative response. The server(s) then render a second user feedback interface comprising the second suggested alternative domain name.

The above features and advantages of the present invention will be better understood from the following detailed description taken in conjunction with the accompanying drawings.

BRIEF DESCRIPTION OF THE DRAWINGS

FIG. 10 is an example user interface used in a possible embodiment for receiving user feedback for a variation technique used on a requested domain name to generate a suggested domain name.

FIG. 12 is an example user interface used in a possible embodiment for receiving user feedback for a variation technique used on a requested domain name to generate a suggested domain name.

FIG. 14 is an example user interface used in a possible embodiment for receiving user feedback for a variation technique used on a requested domain name to generate a suggested domain name.

FIG. 16 is an example user interface used in a possible embodiment for receiving user feedback for a variation technique used on a requested domain name to generate a suggested domain name.

DETAILED DESCRIPTION

Figure 1:
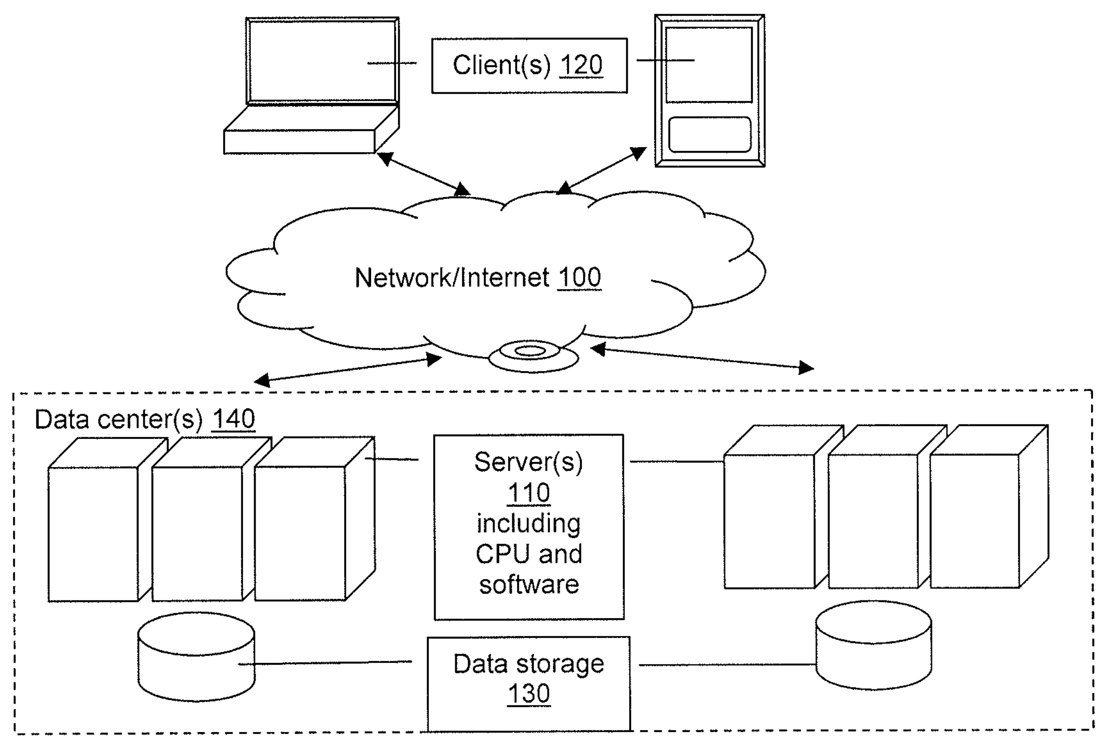
FIG. 1 illustrates a possible system for notifying users of selecting a short list of favorite domain names or searches from a generated list of search results or suggested domain names.

The present invention will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

As the Internet has grown in size and influence, Domain names have become a digital asset with significant value. Because of this, users seeking to register domain names may put a great deal of effort into trying to find the ideal domain name. Many users will search domain names with a specific Top Level Domain (TLD—e.g., .com) and/or Second Level Domain (SLD—e.g., "example" in the domain name example.com) that they want to register.

Customer perception continues to reflect an outlook that ".com is king." Domain name search records continue to confirm that .com TLDs are especially popular and continue to dominate domain name registrations.

Users may search for domain names out of curiosity, or may have seen suggestions for available domain names that trigger ideas for additional domain name searches for the user. Users will often search for domain names via domain name search tools such as a text box that receives a domain name search string from the user. These domain name search tools may be available as part of a domain name search software interface, possibly found on a registrar or other domain name services website, such as the domain name search session interface seen in FIG. 10.

Over time, unavailable domain names may become available because of disuse, where a registrant drops a domain name or allows it to expire. A domain name drop list may comprise a list containing expired domain names soon to be deleted from a domain name registry, and may be used to identify expiring domain names with value.

Unavailable domain names may also become available because the domain name registrant wishes to sell the domain name at auction in a domain name aftermarket. Domain name aftermarkets may comprise any secondary market for domain names. Parties in a domain name aftermarket may register bids or negotiate prices to transfer registration from the registered holder to a new registered holder of that domain name.

Applicant has identified multiple weaknesses in presently existing systems and methods for searching, selecting and registering domain names. No options in presently existing systems and methods allow a user to create a short list of favorite or liked domain names or domain name searches that reflect the user's interest in the domain names prior to entering a purchase path. A user may be unsure whether they want to purchase a domain name, but may not want to lose their research, including the original search parameters used, regarding an available list of search results and/or domain name suggestions. Currently, a customer's only options with regard to searched and recommended domain names or searches include registering the domain name, adding the domain name to a shopping cart (if available) or ending the domain name search session, thereby risking the loss of the user's domain name research, such as the parameters used to generate the desired search results.

Limiting domain name search options to purchasing the domain name, adding the domain name to the shopping cart and/or ending the domain name search session present multiple problems. First, saving individual domain names to a shopping cart or registering the domain name may divert the user from the domain name search and suggestion navigation, so all information relating to the search and suggestion algorithms must be re-run for the user to recover and display their prior research. This means a user has no way to track domain names that they may have an interest in, but are not yet committed to register and/or purchase.

Also, using current methods and systems, neither the user nor the registrar has any way to track either the user's interest in particular domain names or trends of other general, regional or demographic users' interests. Currently, a user cannot remember or save their favorite domain searches or suggestion options across searches, sessions and/or devices because the current shopping-cart-or-purchase model provides no means of storing the user's choices across sessions, or synchronizing these sessions at a central location accessible to all client devices.

From a registrar perspective, there is currently no way to track and learn from such user interest, or to broadcast interest in particular domain names to additional general users or users in the same geographic area or demographic as the current user. Without broader data about the user or users generally to indicate interest in domain names that have not been registered or added to a shopping cart, there is no way for registrars or other domain name registering entities to track this aspect of the users' interest. Specifically, a domain name registrar may want to customize a user experience or merchandising opportunities by applying machine learning to user interest patterns. These user interest patterns may include price points, preferred extensions (e.g., TLDs) and preferred subject matter (e.g., keywords in SLDs). Unfortunately, the data needed for such customization may be severely limited without available data beyond registered domains or those saved to shopping carts.

Applicant has therefore determined that optimal systems and methods will provide means for a user to generate and save a short list of favorite domain names and/or a list of domain names that a user has liked or disliked from a generated list of searched and/or recommended domain names. In such systems, the user may select and add liked, disliked or favorite domain names from the generated list of searched and recommended domain names.

Liked and/or favorite domain names may include domain names that customers considered buying at some point, and selected to be added to a short list and/or general list of liked domain names, but did not commit to registering the names or adding them to a shopping cart. A user may select these liked and/or favorite domain names by interacting with a user interface control (e.g., link, button, checkbox, drop down, radio button, slider, etc.) configured to indicate a user's interest in the selected domain name, and/or a positive or negative response to the suggested domain name, without being required to register the domain name, add it to a shopping cart or otherwise navigate away from the search and recommendation navigation or functionality.

These short and/or general lists may be stored within data storage in association with the user, so that the user may access, across user sessions on any available client devices, the short lists, general lists, and/or the searches that generated them. Thus, a user may run a domain name search on a first client device during a first session, then pick up the search on a second client device during a second session. The short and/or general lists of favorite domain names, and/or the general list of liked or disliked domain names or domain name features may be recalled from data storage and displayed on any available client device as a list in a single view, providing an easy method for users to remember domain names of interest.

Likewise, favorite domain name search sessions may include domain name search sessions that customers would like to remember or re-run, which may be selected to be added to a similar short list. A user may select these favorite domain name search sessions, possibly by interacting with a user interface control such as a link, button, checkbox, drop down, radio button, slider, etc. configured to indicate a user's interest in saving the domain name search session.

This short list of favorite domain name search sessions may be stored within data storage in association with the user, so that the user may access, across user sessions on any available client devices, the short list and/or the favorite/liked/disliked domain names that were selected during or after the saved domain name search session. Thus, a user may begin a domain name search on a first client device during a first session, then pick up the same search session during a second session. The short list of favorite, or liked/disliked domain name search sessions may be recalled from data storage and displayed on any available client device as a list in a single view, providing an easy method for users to remember domain name search sessions of interest.

The data stored in data storage may be utilized by users and registrars alike to compare domain names based on multiple domain name attributes including price, similarity to the users' initial searches, preference of domain extensions such as TLDs, and preference for concepts determined from keywords in SLDs.

As a non-limiting example, the data from selection of favorite and/or liked domain names may indicate that one or more users like and have considered registering particular names at a given price point and including a particular TLD or subject matter within the SLD, but have not yet committed to the purchasing or registering them.

Registrars may benefit from such data, since insights into general interest in such data would provide more robust body of quality data than Is available via domain shopping cart or registration selections. Specifically, optimal systems and methods may generally identify and track users' favorite and/or liked domain names and domain name search sessions, and may specifically learn patterns of users' preferred price points, preferred extensions and preferred subject matter. This machine learning based on favorite and/or liked domain name data may also be applied specifically to the individual user, to users in a geographic location common to the user, and/or users sharing a common demographic with the current user, thereby allowing the registrar or other entity to customize and personalize the user's interface, administration and/or merchandizing experience.

These patterns within the broader and more high quality data may be identified via machine learning to improve the relevance of domain name recommendations to customers and may be applied to future search results. In other words, by analyzing the short list of favorite and/or liked domain names by aggregate, geographic, demographic, and individual users, the registrar may have access to data to improve the quality of search results of all future users, as well as users individually, geographically and demographically. This data may also be useful in merchandising of domain names based on short list favorites and/or liked domain names. In addition, over a duration of time, rules which may be considered specific to users could also be applied to similar users, such as users sharing a common geography or demographic, to test or explore if those merchandising suggestions fare well for others.

In addition to the above-disclosed advantages, the disclosed invention allows a user to span multiple search sessions by aggregating domain names that interest them into a single personalized result set, and compare the result set with users generally and users that share common geography or demographics. When a user creates their favorites list and/or list of liked/disliked domain names, they are able to do the following: continue searching for the right domain name(s) without having to redo prior searches for names they already found; take action on one, several or all domains like purchase, delete/dismiss/dislike; and/or make sure that all domains on their list are still available; personalize their domain suggestion experience to receive personalized domain name suggestions including only those domain names containing features the user prefers; receive domain name suggestions specific to the user's geography or demographic; receive personalized updates of what liked domain names are trending; receive personalized user flow through merchandising options; etc.

In addition, the usage of favorites and/or liked/disliked domain names may function outside of the disclosed embodiments (i.e. in app purchases where a user purchases a hosting plan and chooses a qualifying free domain, advertising pods in merchandising pages, advertising spend to attract similar customers, etc.). In such embodiment, the domain name may be presented to a user based on machine learned data from favorites and/or liked/disliked domain names and a user may chooses one of the domains from their favorites or liked domains list.

Thus, a user may be presented with suggested domain names and the user experience related to those domain names may be customized to the user according to user feedback and the user's stored profile. For example, the disclosed system may learn which domain name characteristics a user likes or dislikes by presenting each suggested domain name to the user via a user feedback interface, and receiving positive or negative feedback to the domain name characteristics via user interface controls on the user feedback interface.

Each suggested domain name presented on the user feedback interface may be generated by a domain name spin software engine using one or more variation algorithms that modify a domain name, requested by the user, using one or more of multiple variation techniques (e.g., changing a .com TLD to a .co TLD, changing a token "bicycle" in the SLD to "cycle," etc.). The variation techniques are used to generate each suggested domain name. The user interface controls may receive positive or negative feedback from the user about the variation technique used to generate a modified domain name characteristic in each future suggested domain name.

If the feedback is positive, the domain name spin software engine may generate a second suggested domain name using the same one or more of the multiple variation techniques. However, if the feedback is negative, the domain name spin software engine may generate the second suggested domain name using one or more of the multiple variation techniques that do not include the one or more variation techniques used to generate the first suggested domain name.

As each positive and negative feedback is received from each user, the server(s) may store these user preferences in data storage, in association with either a user profile for the user, and/or an identified session if the user was not logged into the system. The system may identify patterns in the user and/or domain name search session feedback by identifying variation techniques that consistently receive positive or negative feedback. As multiple feedback is received from an identified user and/or session, the server(s) may execute internal logic within the variation algorithms in the server software, and/or query a database to establish a predefined threshold of positive or negative feedback. If the patterns for the user or session indicate consistent positive or negative feedback for particular variation techniques, above or below the predefined threshold respectively, the server(s) may generate a user preference interface receiving, from the user, an explicit positive or negative user preference response regarding whether the identified variation technique should be included within, or excluded from, future suggested domain names respectively. The user preference interface may also include multiple user interface controls receiving, from the user, explicit reasons for the positive or negative feedback for any of the particular variation techniques.

If the user preference response is positive, the domain name spin software engine may generate each subsequent suggested domain name using the same one or more of the multiple variation techniques for consistent positive feedback. However, if the user preference response is negative, the domain name spin software engine may continue to generate each subsequent suggested domain name using the one or more variation techniques used to generate the first suggested domain name, along with any of the additional one or more variation techniques.

As data is gathered from each user of the system, the server(s) may render and display a user interface, presenting potential domain name marketing or other merchandising opportunities personalized to each system user. The potential marketing and/or other merchandising data may be generated according to an analysis, by the server(s), of positive responses by each system user, system users sharing a common demographic and/or geographic location, and/or all system users in the aggregate.

For example, the server(s) may analyze the user's positive responses to the variation techniques used in the first, second and/or any subsequent suggested domain names, as well as any additional stored data in the user profile, to generate, on a domain name-related user interface (e.g., a domain name control panel), a list of available recommended domain names personalized to the user. Using an aggregation of search data, positive feedback data and/or favorite domain name data from all system users and/or domain name search sessions, the server(s) may display, in association with the available recommended domain name list, the number of users who have liked, added to favorites and/or searched each domain name in the displayed list of recommended domain names. This aggregated data may motivate the user to register the domain name, or add the domain name to a shopping cart or favorites list. Each recommended domain name displayed on the domain name-related user interface may therefore include a user interface control to register, like, or add the domain name to a shopping cart or a list of domain name favorites.

The user profile for each system user may define various geographic, demographic (e.g., industry) and/or other user-related data for each of the system users. Using this user-specific data, the server(s) may display, on the domain name-related interface, a list of available domain names receiving the highest likes, the highest amount of domain names being added to lists of favorites, and/or the highest amount of searches for that domain name. These lists may be broken out and displayed according to a geography, demographic trait, and/or any other user profile attribute common between the user and the highest ranked domain name features. As with the personalized domain name list, this aggregated data may motivate the user to register the domain name, or add the domain name to a shopping cart or favorites list. Each top-ranked domain name displayed on the domain name-related user interface may therefore include a user interface control to register, like, or add the domain name to a shopping cart or a list of domain name favorites.

Several different environments may be used to accomplish the method steps of embodiments disclosed herein. FIG. 1 demonstrates a streamlined example and FIGS. 2 and 9 demonstrate a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/ components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to, wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

Figure 2:
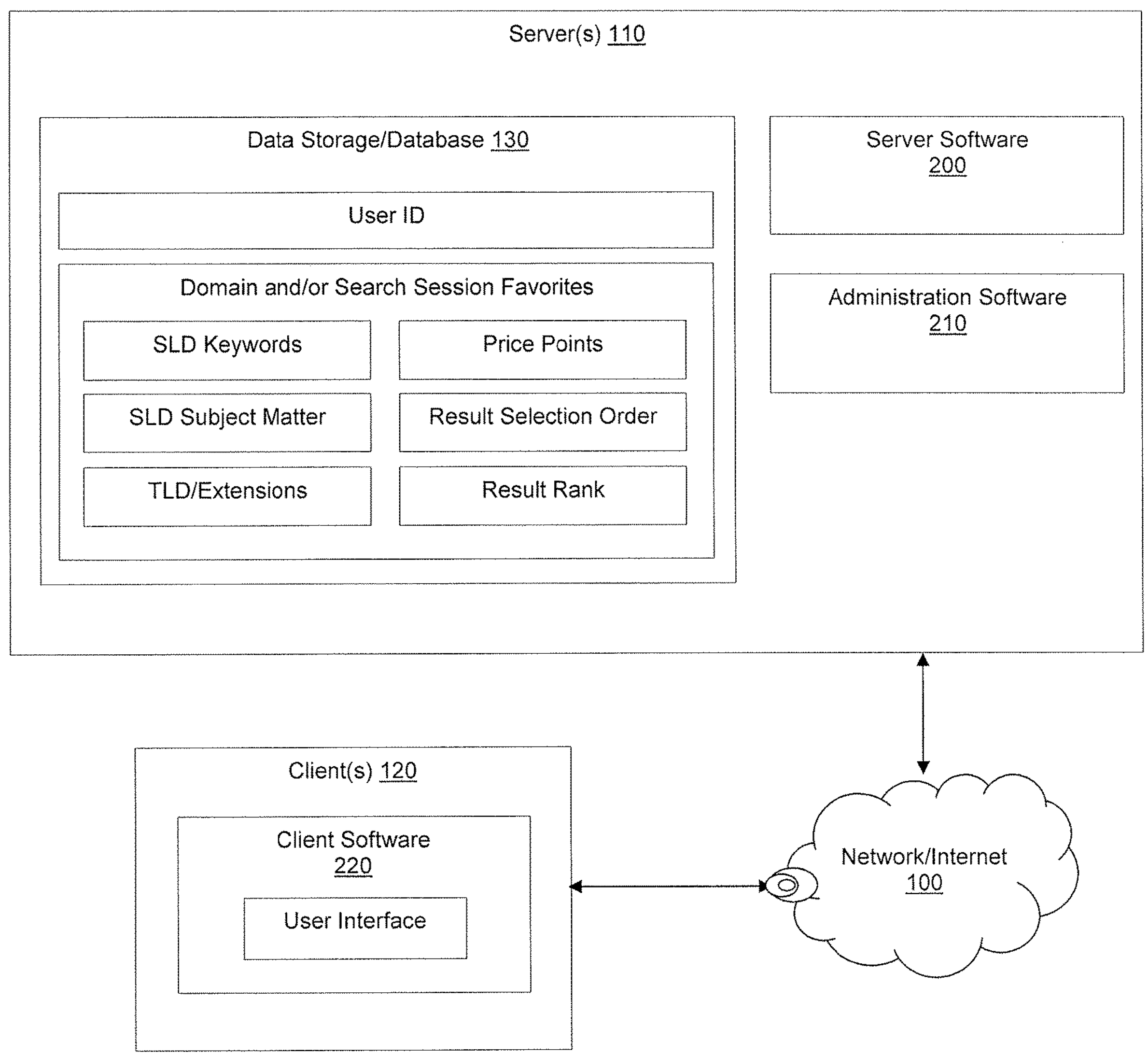
FIG. 2 illustrates a more detailed possible system for selecting a short list of favorite domain names or searches from a generated list of search results or suggested domain names.
Figure 3:
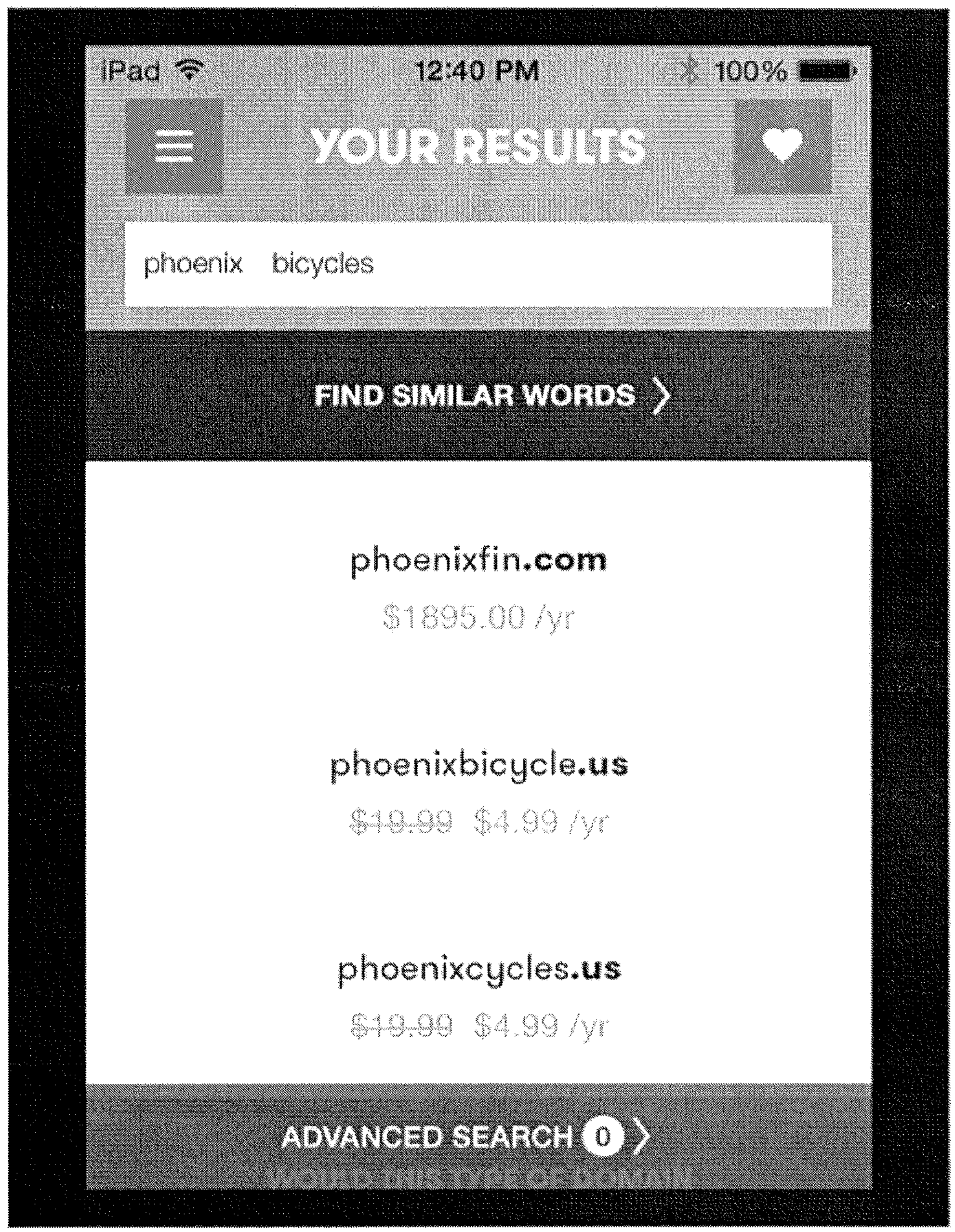
FIG. 3 is an example user interface used in a possible embodiment for selecting a short list of favorite domain names or searches from a generated list of search results or suggested domain names.
Figure 9:
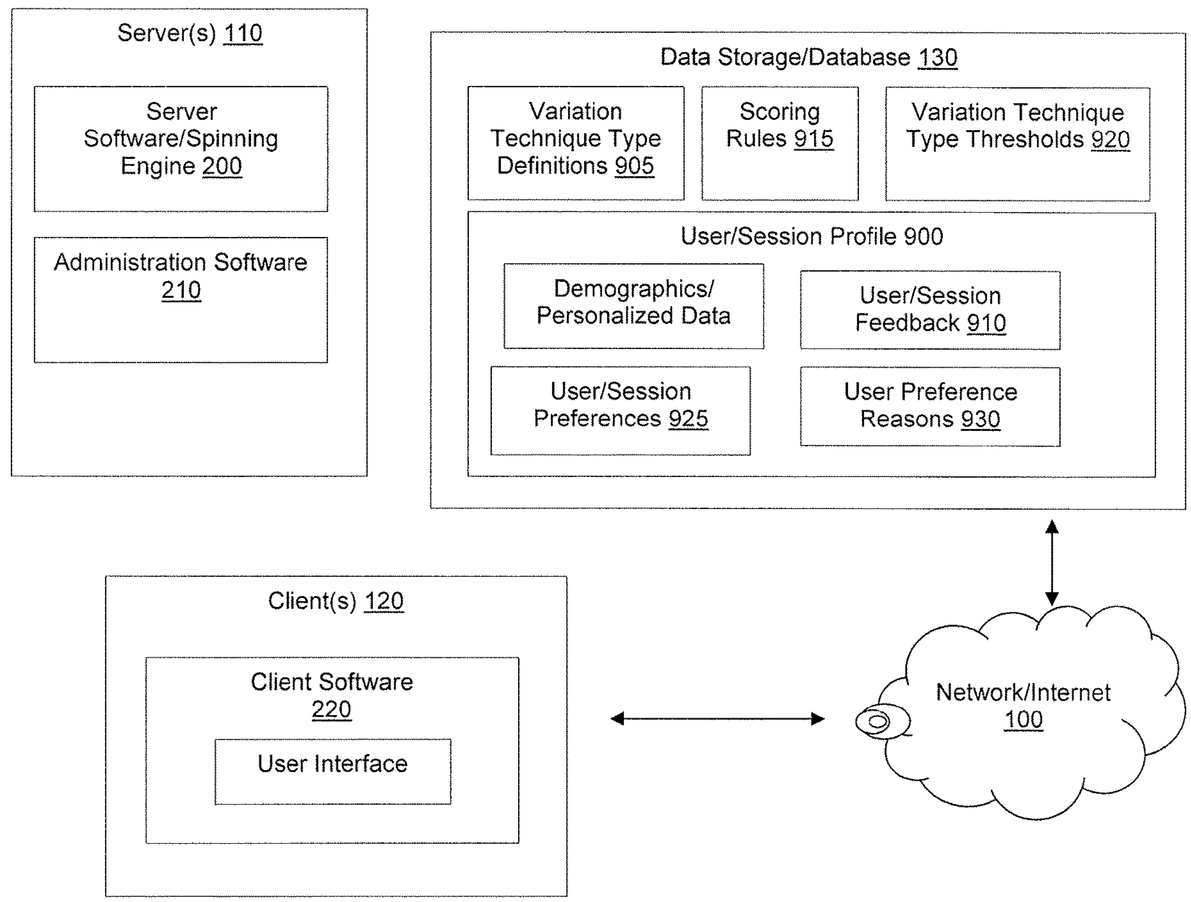
FIG. 9 illustrates a more detailed possible system for receiving user feedback for a variation technique used on a requested domain name to generate a suggested domain name.

FIGS. 2 and 9 show a more detailed example embodiment of an environment for the systems, and for accomplishing the method steps, disclosed herein. As non-limiting examples, all disclosed software modules 200 may run on one or more server(s) 110 and may include one or more user interfaces, such as those seen in FIGS. 2-7, 10, 12, 14 and 16, generated by the server(s) 110 and transmitted to and displayed on the client(s) 120. The user interface(s) may be configured to receive input from the user and transmit this input to the server(s) 110 for the administration and execution of the software 200 (which may further comprise one or more domain name spinning modules, described in more detail herein), using data in data storage 130 associated with the software modules 200. Thus, the disclosed system may be configured to execute any or all of the method steps disclosed herein.

Server(s) 110 may be hosted by any entity, possibly a hosting provider, a domain name registrar, a website development company, any other software service provider or any combination thereof. To manage users of such a system, including individuals or organizations, server(s) 110 may host and run a user administration program 210 such as GoDaddy's My Account control panel for management of hosting and domain names, as a non-limiting example.

In such an administration control panel program, or admin 210, each user may be assigned a user id. This user id may identify transactions performed by each user. These transactions may be stored as data records in data storage 130, each data record including the user id to associate the user with the transaction in data storage 130. As non-limiting examples, such transactions may include any transactions during a domain name search session, as described below, associating transactions performed by the user during the domain name search session with the user id.

The data records may also store contact data for each user, possibly including email, SMS, social media account data, etc. to contact the user for any contact purposes disclosed herein. In some embodiments, the user may select specific contacts as a means of contact for purposes of receiving notice as disclosed in the current invention. In some embodiments, the data records may also include geographic, demographic and/or any other user-specific information about the user, associated with the user id, as received from the user when the user profile was created.

The admin 210 may include a Domain Control Center (DCC) for administration of domain names registered to the user. As non-limiting examples, the DCC may include means for listing and managing all domain names registered to the registrant, possibly including auto renewal of the domains, DNS record settings, etc. In some embodiments, the DCC may be used to display the disclosed notices, reports and/or domain name purchase offers, as described in more detail herein.

The user may select settings from the admin 210 to control administration of the disclosed invention. In addition, sever software 200 running on server(s) 110 may analyze all transaction data received in association with any given user id (or with all transaction data received), calculate appropriate parameters for the administration of the disclosed invention, and/or may set calculated optimal default parameters, as discussed in detail below. Thus, any combination of user settings and/or software calculations for user parameters may be used to manage the disclosed invention.

A user may purchase and install client software 220 on client(s) 120. In some embodiments, the client software 220 may comprise a server/client model, possibly web services and/or other web-based software provided through a web browser running on client(s) 120. This software may comprise software modules 220 configured to communicate with the server software 200 running on server(s) 110 in order to accomplish the method steps disclosed herein.

Server software modules 200 may comprise one or more domain search and favorites selection and/or one or more domain name spin engine software modules, which may be configured to search for a domain name using any techniques known in the art for searching and determining the availability of a domain name. As a non-limiting example, a domain name registrar, such as GoDaddy, may provide a domain name search tool website or other client based control panel, such as the non-limiting example interface seen in FIG. 10, for users to enter searches for domain names or domain name keywords to determine whether the desired domain name is available for registration. For example, a registrar's website may include a web page rendered on the server and transmitted to a client machine, such as a laptop or a smart phone. Client(s) 120 may receive the data associated with the user's desired domain name from the user interface. Client software 220 may then be configured to transmit the domain name search parameters to server(s) 110 for processing.

The request to search and/or register the domain name may be received by server(s) 110 and may trigger logic within software modules 200 running on server(s) 110 to begin a domain name search request session, which processes and captures the session data described herein, until a user either registers a selected domain name or otherwise terminates the session. The server software logic may assign a unique identifier to the domain name search session, which in some embodiments, may be temporarily stored in the memory of the server(s) 110 to be used by the server's software, and/or may be stored as a data field within one or more database records within in database 130.

Server(s) 110 may be configured to receive and save, possibly in association with the session id and/or user id, the transmitted parameters for the domain name search request session, and server software 200 may be configured to process the search request to determine the availability of the searched domain names, according to any techniques known in the art. In some embodiments, the results of this domain name search may be immediately transmitted to, and displayed on client(s) 120. If the user's selected domain name is available for registration, the user may register the domain name using any known domain registration techniques.

However, if server(s) 110 determine that the domain name is unavailable for registration, server software 200, possibly the domain name spin software engine 200, may further be configured to suggest and/or recommend suggested alternative domain names according to any domain name suggestions, recommendation or other domain name spinning techniques known in the art. Non limiting examples of such spinning and/or variation techniques may include replacement of a TLD in the requested domain name with a TLD in the suggested alternative domain name (e.g., changing .com to .co); a replacement of the TLD in the requested domain name with a ccTLD in the suggested alternative domain name (e.g., changing .com to .us); one or more tokens added within the suggested alternative domain name to the beginning, middle or end of the suggested domain name (including geographic related tokens—e.g., changing phoenixbicycles.com to phoenixbicycles-arizona.com); one or more tokens in the SLD of the requested domain name having been replaced with synonyms in the suggested alternative domain name (e.g., changing phoenixbicycles.com to phoenixcycle.com); replacing a written number in an SLD to a numeric value or vice versa (e.g., changing phoenixbicycles1.com to phoenixbicyclesone.com); a price difference between the requested domain name and the suggested alternative domain name; or any other spinning and/or variation techniques known in the art. Server(s) 110 may then be configured to transmit the recommended domain names to client(s) 120 for display.

Server software 200 may generate and order suggestions for domain names according to any domain name suggestion or other search result-ranking algorithm known in the art. As noted herein, this domain name suggestion ranking may be customized according to user feedback from the aggregation of all users, may be customized according to a specific market segment such as a geographic area and/or demographic, and/or may be customized to a specific user based on previous user selections, favorites, likes, user preferences, and/or feedback loop data as described herein.

However, a user profile, or previous data specifically stored in association with the user id for the user is not required to generate recommended domain names. In some embodiments, a new user may download, install and run the client software as described above. Without an existing user profile account to generate related suggested domain names, the domain names suggested for the user may be randomly generated from a list of available domain names, possibly based on any available data for the new user. These randomly-generated domain names may be presented to the user, using any techniques described herein to, and may receive positive or negative user feedback in the form of domain name likes or dislikes, adding the domain name to a list of domain name favorites, registering a domain name, adding the domain name to a shopping cart, etc.

As each randomly selected domain name is presented to the user, metadata associated with each suggested domain name may be transmitted to the disclosed software modules for analysis. Based on the received and analyzed metadata, the disclosed software modules may identify patterns, based on the positive or negative feedback, in the user's preferences. Thus, as feedback is received for each suggested domain name, the disclosed software modules may select each subsequent suggested domain name according to the user preferences identified from the user feedback. In some embodiments, the user may explicitly answer generated feedback to more quickly refine the user's preferences.

In some embodiments, user profile data may be imported from a social media account for a new user of the disclosed system. In these embodiments, the new user may log into the disclosed software application using a social media account that is already established for the user. This login information may allow the disclosed system to access data about the new user available through the social media account. As non-limiting examples, this data may include user location information, including current user location information and origin location information (i.e., user's place of birth), user likes or dislikes, professional information, psychographic information, topics or businesses that the user is following through the social media account, etc.

To access this data about the new user available throught the social media account, the disclosed software modules may access the user's social media account data, possibly by accessing an API for the social media account using the user's provided login and password, and may download structured data from the user account. This structured data may include keywords, which may be compared with the available domain names to determine which available domain names contain the keywords most relevant to the user's interests determined through the user's social media account data. Using the positive or negative feedback for this information, the disclosed software modules may correlate this feedback with the suggested domain names, so that the domain names containing the keywords with the highest positive feedback in the social media account are displayed most prominently in the suggested domain names, while domain names containing keywords with the highest negative feedback would not be displayed. This social media data may ultimately be used by the disclosed system to create a user profile for the user.

FIGS. 3-7 demonstrate an example embodiment for searching domain names and selecting favorite domain names from the search results, including a user interface for client software 220. In this example embodiment, the user has searched the keywords phoenix and bicycles. If the user during this session chooses to save this search session as a favorite search session, server software 200 may identify the search parameters for the search session, possibly including the search terms phoenix and bicycles and save them as parameters for a favorite search session.

In this embodiment, the displayed domain names may comprise a list of all search results and/or suggested domain names related to the domain name search of the keywords phoenix and bicycles. Server software 200 may determine that phoenixfin.com, phoenixbicycle.us, and phoenixcycles.us were the closest matches for available domain names. These matches may be displayed in the "Your Results" area of the user interface.

Each entry within the list may comprise a user interface control. Any user interface control may be used including a link, checkbox, drop down, radio button, etc., allowing the user to click, tap or otherwise select a particular domain name to be added to the short list of favorite domain names and/or a favorite search session to be added to the short list of search sessions. In the example embodiment(s) seen in FIGS. 3-7, the interface control may include a graphic and/or mobile device selection "switch" for tapping or sliding a selection, in this case, phoenixbicycle.us, to indicate that it is a domain name favorite.

In FIGS. 3-7, the selection may be complete as the user slides the selection to the right, and an icon identifying that the selected domain name is a favorite may slide into view to replace the favorite domain name, in this case, phoenixbicycle.us. The converse may also be true of deselecting the favorite domain name, where the selection moves from right to left, replacing the favorite domain name icon with the original domain name search result entry, as would be the case moving from FIG. 7 to FIG. 3.

Server software 200 may be configured to add each selected domain name to the short list of favorite domain names. Client software 220 may receive the user input from the user interface control indicating interest in and intent to add the domain name to the short list of favorites.

Client(s) 120 may transmit all data related to the selected favorite domain name(s) and/or search sessions to server(s) 110. For each of the favorite domain names, this data may comprise any data specific to the favorite domain name and/or search session, including, but not limited to: a user id associated with the user account and/or user session that selected the favorite domain name; a rank of the domain name within the order of the list of search results and/or recommended domain names; an order that the favorite domain name was selected relative to other favorite domain names; a price point for registering the favorite domain name, one or more keywords within the domain name SLD; a TLD associated with the favorite domain name; the search parameters for a favorite domain name search session; etc.

Server(s) 110 may be configured to receive any combination of this data for each of the favorite domain names and/or search sessions, and may store it in association in data storage 130. The data received for each individual domain name and/or search session favorite may be aggregated into a collection of data specific to that user. In some embodiments, the data received for each of the individual domain name and/or search session favorites may be aggregated together with data received for domain name and/or search session favorites received by all users. This stored and aggregated data may be used in the analysis and customization algorithms described herein.

At any time during a user session, the user may retrieve, display and/or register the list of domain names they have selected and stored. To accomplish this, the user may access and utilize client software 220 to display their list of favorite domain names, select the domain names for registration, and access the appropriate domain name registration and/or shopping cart software to purchase the domain name registration.

Likewise, the user may retrieve and/or display the list of domain name search sessions they have selected and stored. To accomplish this, the user may access and utilize client software 220 to display their list of favorite domain name search sessions, and select the domain name search session(s) to re-run the domain name searches in the domain name search session(s).

Figure 4:
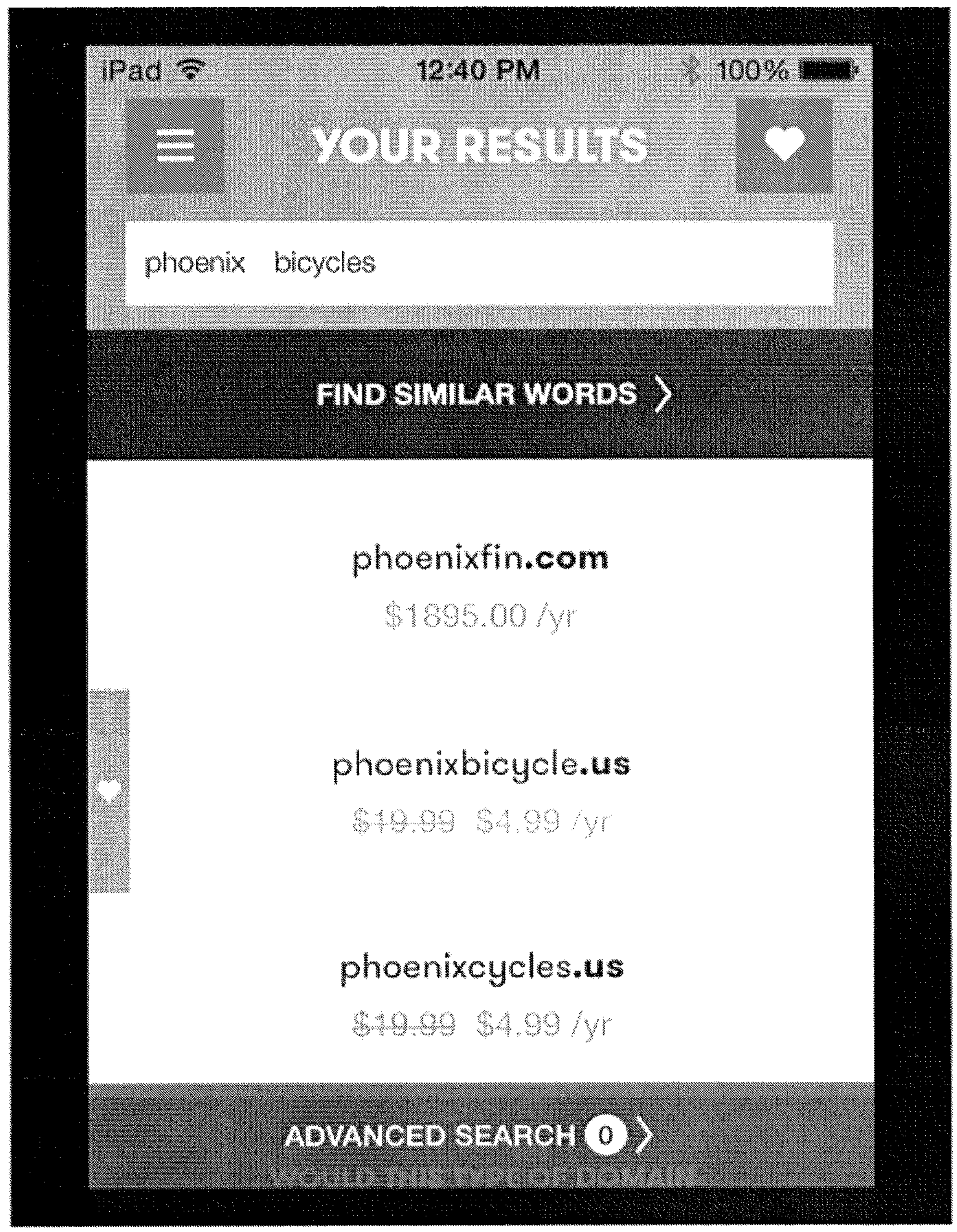
FIG. 4 is an example user interface used in a possible embodiment for selecting a short list of favorite domain names or searches from a generated list of search results or suggested domain names.
Figure 5:
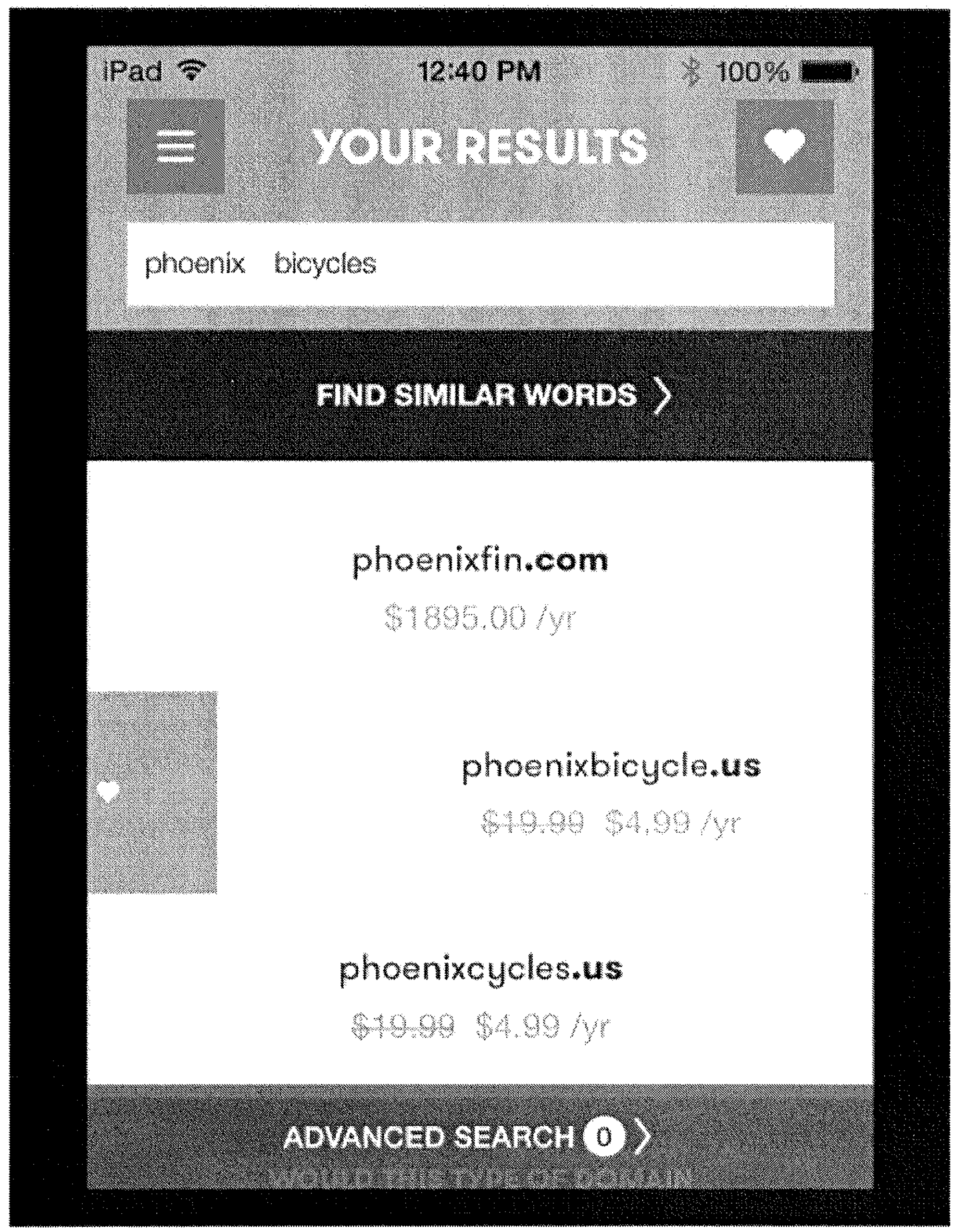
FIG. 5 is an example user interface used in a possible embodiment for selecting a short list of favorite domain names or searches from a generated list of search results or suggested domain names.
Figure 6:
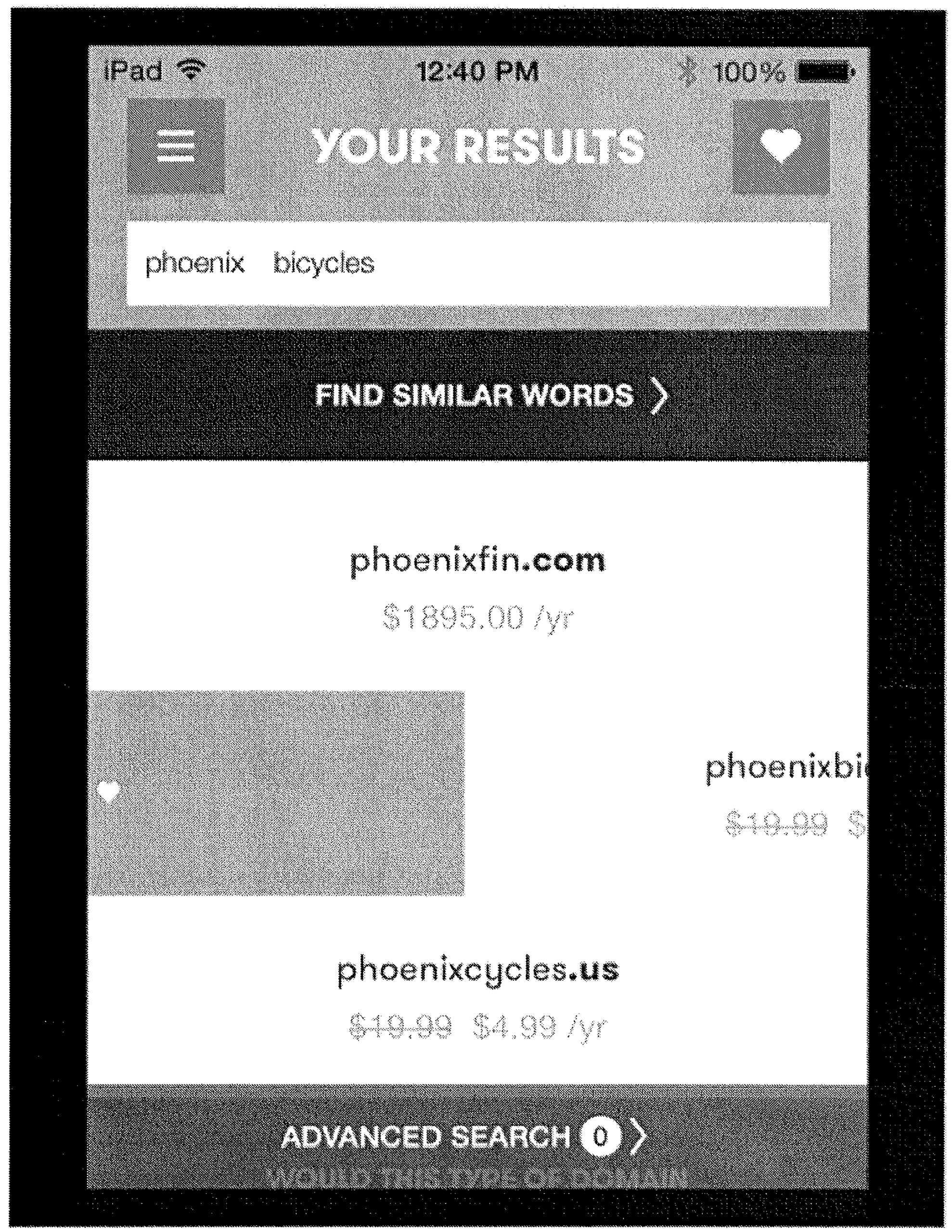
FIG. 6 is an example user interface used in a possible embodiment for selecting a short list of favorite domain names or searches from a generated list of search results or suggested domain names.
Figure 7:
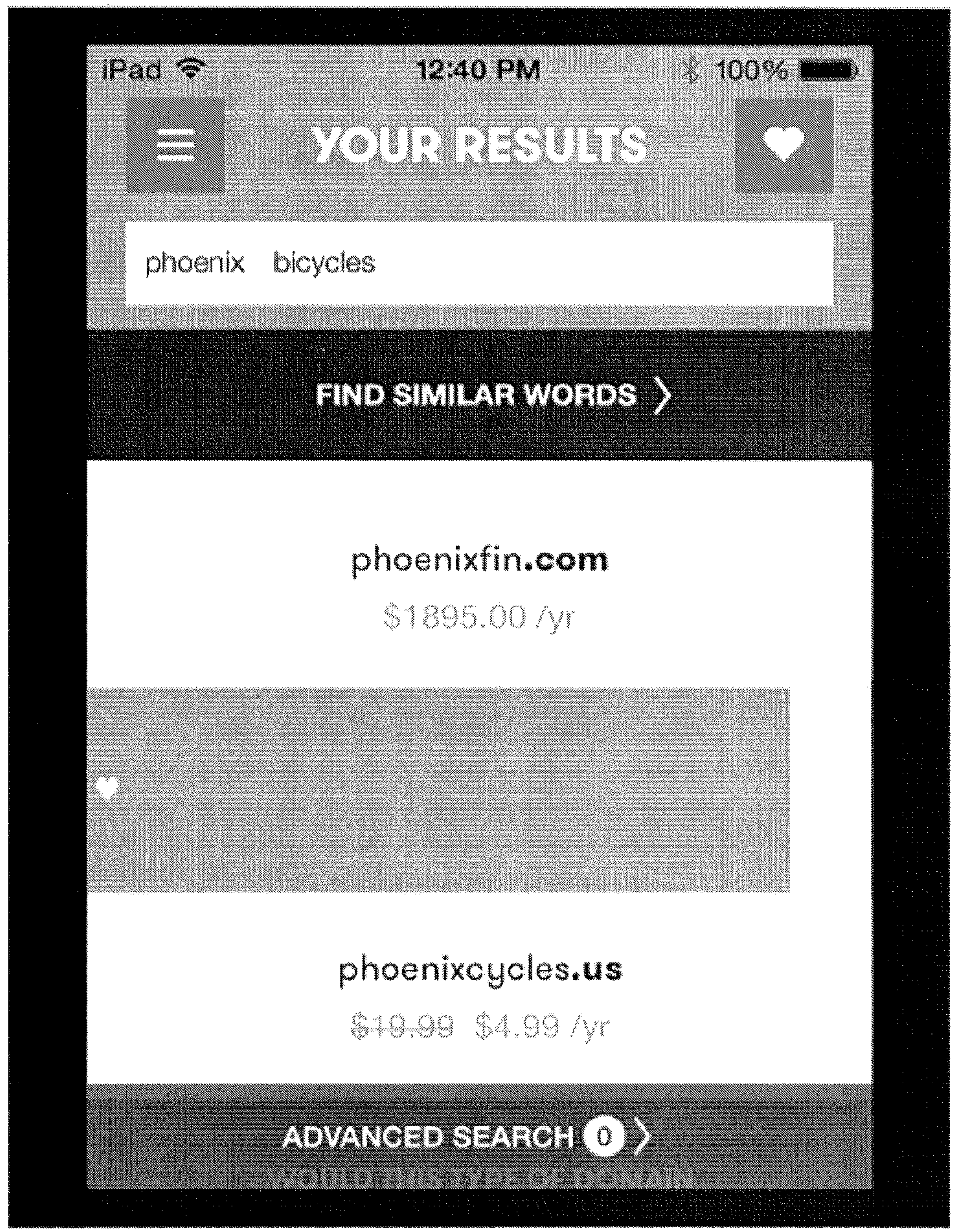
FIG. 7 is an example user interface used in a possible embodiment for selecting a short list of favorite domain names or searches from a generated list of search results or suggested domain names.
Figure 8:
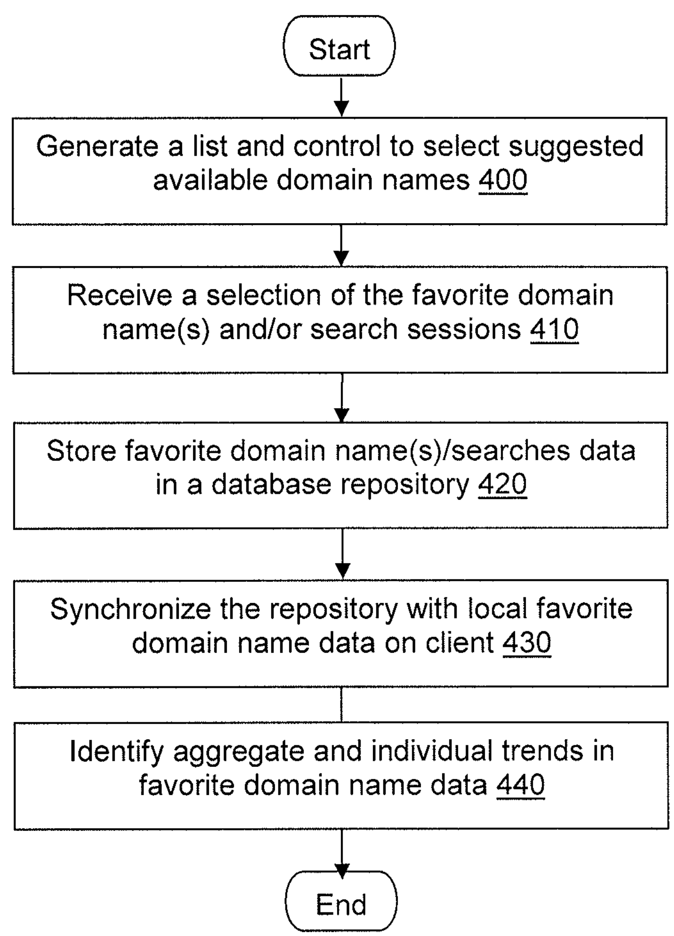
FIG. 8 is a flow diagram illustrating a possible embodiment of a method for selecting a short list of favorite domain names or searches from a generated list of search results or suggested domain names.

Several different methods may be used to provide and manage the present systems. FIG. 4 represents a flow diagram for one possible embodiment of the previously described improvements on presently existing systems. In this example embodiment, one or more server computers 110 may be communicatively coupled to the network 100 and may be configured to: generate a list of suggested available domain names displayed during a domain name search session and at least one user interface control associated with the list of suggested available domain names (Step 400); receive, from at least one client computer communicatively coupled to the network, at least one selection of the at least one favorite domain name (Step 410); store the at least one selection of the at least one favorite domain name in a centralized repository of favorite domain name data, stored in a database communicatively coupled to the network (Step 420); synchronize the centralized repository of favorite domain name data with at least one local favorite domain name data on the at least one client computer (Step 430); and identify, via machine learning, at least one aggregate or individual trend within the repository of domain name data (Step 440).

In some embodiments, client software 220 may be configured to display domain name search results and/or recommended domain names, as well as receive selections of the user's domain name favorites, while the client software 220 is offline. As non-limiting examples, the user may be able to browse domain name search results and/or recommended domain names even though client(s) 120 and/or client software 220 are not connected with the Internet, are not otherwise communicatively coupled to network(s) 100, are unable to connect to or access server(s) 110, are not logged in to a user account, have not initiated a user session and/or have recently installed client software 220.

Client software 220 may utilize similar algorithms to those disclosed in order to generate, display and receive a selection of a local copy of favorite domain names while the user is offline. Specifically, client software 220 may be configured to receive the user's local selections of favorite domain names, as well as all relevant data related to each selected domain name, and store the selection and data locally. In some embodiments, the local storage of the selections and data may require a command from the user to store the data locally and/or offline.

Client software 220 may then be configured to store the selections and data locally in any known local format. As non-limiting examples, client software 220 may store the selections and data on the local client device 120 as cookies, in a local database, as one or more cache files within software 220, as an XML or other markup language file, as a local text file, etc.

As a new connection between client(s) 120 and server(s) 110 is established, client software 220 and/or server software 200 may be configured to identify all data associated with each of the locally saved favorites in association with the user id and/or user session, and download or otherwise transfer this data to server(s) 110 for storage in association with the user account. As a non-limiting example, the connection between client(s) 120 and server(s) 110 may occur as the user: logs into the user's account via the user id; searches domain names, registers domain names; or moves a domain names to a shopping cart. This synchronization process may be repeated for all client(s) 120 associated with the user, so that all domain name favorites may be synchronized in centralized data storage 130 in association with the user account.

This synchronization may occur by updating all local domain name favorite data received since the last user login, with existing domain name favorite data in data storage 130. For example, server software 200 may identify any local domain name favorites data that does not already exist in data storage 130, as well as any other updates or deletions affected locally on client(s) 120 since the client software 220 was last connected with server(s) 110. Server software may then add, update and/or delete the related records in data storage 130 appropriately. This process may be repeated with local domain name favorite data on each of the clients associated with the user id, until all local domain name favorites data is merged with domain name favorite data stored in data storage 130.

Thus, the compiled list of domain name favorites associated with the user id may be available across all client devices 120 and user sessions. Because local data relating to the favorite domain names is regularly updated on the server 110 and centrally available via the server's data stores 130, users may access their favorite domain names across any user session, using any client 120 device. As users log in, server software 200 may detect the login and may access the user's user id as well as all data associated with domain name favorites for that user id. Server(s) 110 may then generate and transmit the favorite list for display on an client(s) device 120 in use by the user.

As a non-limiting example of the synchronization and availability of favorite domain names, a user may install an app for client software 220 on a mobile device without accessing their user account or otherwise connecting to server(s) 110. The software may include a list of domain name suggestions, and the user may select five favorite domain names from the domain name list and log in to their user account. Server software 200 may then detect the login and add the data for the five favorite domain names to data storage 130 in association with the user id for the user session.

The user may likewise install a desktop application for client software 220 on their desktop computer without connecting to the Internet, connecting with server(s) 110 or otherwise accessing their user account. The user may select three additional favorite domain names from the list of suggested domain names, then log in to their account. Server software 200 may then detect the login and add the three new favorites, in association with the user id, to the five favorites already existing in data storage 130. Likewise, if any favorite domain names were modified, deleted or otherwise updated, the appropriate data records in data storage 130 may be updated accordingly.

As seen in FIG. 10, the disclosed invention may receive a requested domain name from a user and generates a list of suggested domain names if the requested domain name is not available. As seen in FIG. 10, in addition to registering the suggested domain names or adding the suggested domain names to a shopping cart or list of favorites, as described herein, the user may provide feedback, in the form of liking or disliking the suggested domain names (or individual elements of each of the suggested domain names).

Figure 11:
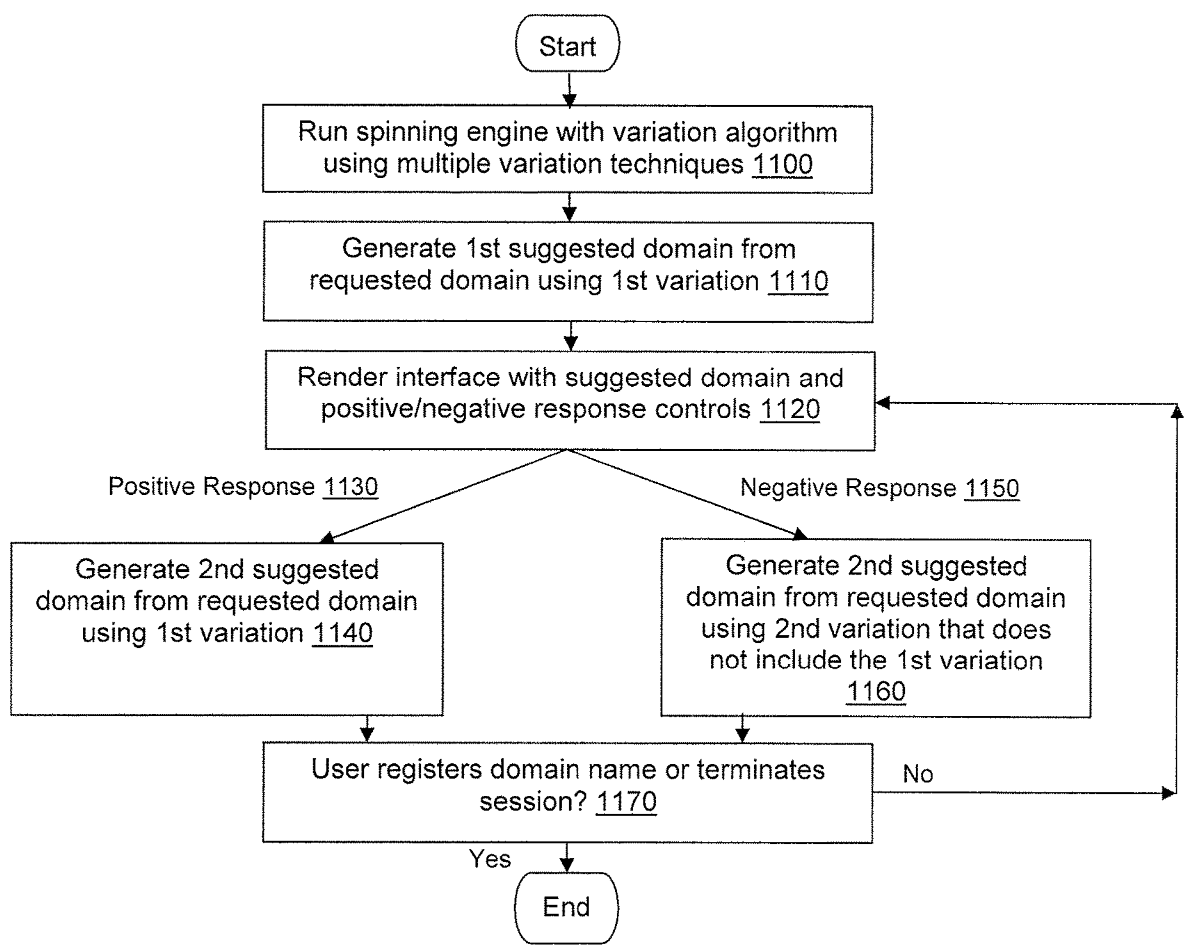
FIG. 11 is a flow diagram illustrating a possible embodiment of a method for receiving user feedback for a variation technique used on a requested domain name to generate a suggested domain name.

FIG. 11 demonstrates a flow diagram representing instructions executed by at least one processor on a server computer 110 coupled to an electronic network 100, the instructions causing the server computer 110 to execute the following method steps. In step 1100, the server computer 110 runs, within an active memory of the server computer, a domain name spin software engine 200 executing a variation algorithm using at least one of a plurality of variation techniques.

In step 1110, the server 110 generates, according to the variation algorithm, a first suggested domain name by modifying a requested domain name using a first variation technique in the plurality of variation techniques. In step 1120, the server 110 renders a user feedback interface comprising: the first suggested domain name; a first user interface control encoding a positive response to the first variation technique; and a second user interface control encoding a negative response to the first variation technique.

The server 110 transmits the user feedback interface to a client computer 120 via the electronic network and decodes a transmission received via the electronic network 100 and encoding the positive response or the negative response. In step 1130, the server computer 110 determines if the transmission encodes a positive response. In step 1140, responsive to the transmission encoding the positive response, the server computer 110 generates a second suggested domain name by modifying the requested domain name using the first variation technique in the plurality of variation techniques.

In step 1150, the server computer 110 determines if the transmission encodes a negative response. In step 1160, responsive to the transmission encoding the negative response, the server computer 110 identifies a second variation technique in the plurality of variation technique, and generates the second suggested domain name by modifying the requested domain name using the second variation technique, the second variation technique comprising at least one of the plurality of variation techniques that does not include the first variation technique.

In step 1170, the server computer 110 determines whether a domain name was registered or whether the user terminated the session. If so, the method may end. However, if not, the server computer 110 may render a second user feedback interface comprising the second suggested domain name and repeat the process from step 1120 until a domain name is registered or the session terminates.

Server(s) 110 may analyze the user's requested domain name to determine component elements that make up the domain name. Using the examples above, if the user requested a search for phoenixbicycles.com, the software modules 200 on server(s) 110 may identify the TLD within the requested domain name as .com. In this example, server(s) 110 may also tokenize the SLD (phoenixbicycles) to identify distinct keyword tokens (phoenix and bicycles).

As each suggested domain name is generated, server(s) 110 may store each suggested domain name in association with a price required to register that domain name. To determine the required price, server(s) 110 may query databases maintained by a domain name registrar, for example, in order to determine fees required for registrations of domain names.

During each domain name search session, server(s) 110 may aggregate the data received from user input, or related software transactions, into a collection of domain name search session data records 900. In the embodiments described herein, if any referenced data table has not been created within database 130 to store such session data records 900, as needed by the disclosed method steps, server(s) 110 may be configured to execute one or more database queries to create the necessary table(s).

The domain name search session data records 900 may be stored within the active memory of server(s) 110, and may be used by the software logic within server software modules and/or domain name spin software engine modules 200, as needed, during the domain name search session. These data records 900 may also be stored as database data records within data storage 130 to be accessed by the server software and/or domain spinning engine 200 as needed. Each of the domain search session data records 900 may comprise data fields including, for example: a unique identifier for the domain name search session data record; a unique session identifier for the session; the requested domain name; a user profile identifier associated with the session (assuming the user is authenticated with the system, and possibly including geographic and/or demographic data for the user and/or session).

The domain name spin software engine 200 may generate one or more suggested domain names using different domain name variation techniques. For example, in some embodiments, the domain name spin software engine 200 may generate a first suggested domain name by modifying the requested domain name using a first variation technique in the plurality of variation techniques and receiving positive or negative feedback from a user. The spin engine 200 may then generate a second suggested domain name using the first variation technique or the second variation technique according to the positive or negative user feedback. In some embodiments, the domain name spin software engine 200 may generate multiple suggested domain names during a spin.

The example user interface shown in FIG. 10 demonstrates multiple suggested domain names generated during a single domain name spin. Each of the suggested domain names identifies one or more domain name variation techniques used to spin the suggested domain names from the requested domain name. By contrast, the example user interface shown in FIG. 12 demonstrates a single suggested domain name generated by modifying the requested domain name using one or more variation techniques from a plurality of domain name variation techniques.

For each suggested domain name generated, server(s) 110 may apply or identify modifications made to the suggested domain name. To make this application or determination, server(s) 110 may reference one or more variation technique data records, stored in the active memory of server(s) 110 and/or within a variation technique type definition data table 905 in data storage 130. Each of the variation technique data records may define applicable and identifiable domain name variations, such as any of the variation/spinning techniques described above, between a requested domain name and one or more suggested domain names. Server(s) 110 may therefore access and reference these data records, for each suggested domain name generated, to apply or identify specific variations between the requested domain name and each suggested domain name.

For each applied or identified variation technique used to modify the requested domain name and generate each of the suggested domain names, server(s) 110 may store in active memory, and/or execute a database query to create, possibly within a user and/or session feedback data table 910, a user and/or session feedback data record reflecting a variation technique applied or identified in generating the suggested domain name from the requested domain name. Each user and/or session feedback data record may comprise, as non-limiting examples: a unique applied/identified variation technique identifier; a join to a specific session data record; the requested domain name; the suggested domain name; the variation technique used to modify the type of applied and/or identifiable variation (possibly as a join to a variation technique data record; the identifiable variation made (e.g., the synonym replacing the original token); and a score initialized at a neutral value (e.g., 0).

Referring now to FIG. 10, server(s) 110 may render a user interface asking a user if they would like to customize suggested domain names by accessing the user feedback interface ("Provide Feedback for Suggested Domain Names"). The client computer 120 may receive this selection or one of the alternative selections, and this response may be submitted and transmitted to server(s) 110. Server(s) 110 may receive this transmission and process it accordingly.

In some embodiments, if the user bypasses the option to provide feedback for the suggested domain names, but selects one or more domain names and registers or adds the domain name(s) to a shopping cart or favorites list, the domain name spin engine software 200 on server(s) 110 may implicitly customize future domain name suggestions based on implicit, rather than explicit user input. Using FIG. 10 as an example, a user may select the third domain name in the list (phoenixcycles.com) in order to view details about this suggested domain name, or may add the alternative suggested domain name to a list of favorites or to a shopping cart, or may register the suggested domain name.

The system may identify the action taken by the user in order to implicitly determine that the user was more interested in the variations between the requested domain name and the third alternative domain name, than the variations made between the requested domain name and the first and second alternative domain names (phoenixbicycle.co, phoenixbicycle.us). Having made this determination, server(s) 110 may therefore update each user feedback data record associated with each variation to reflect a positive score (e.g., +3) for each variation reflected in the third list item (e.g., making cycle plural, .com TLD), and a lower weighted negative score (e.g., −1) for each variation reflected in the first two list items (e.g., ccTLDs .co and .us).

In order to determine the amount to increase or decrease the score for each alternative domain name variation, server(s) 110 may reference a scoring rules data table comprised of scoring rules data records, which assign a score to increase or decrease identified variations in a suggested alternative domain name, based on a user's actions in relation to a suggested alternative domain name. In some embodiments, the amount to increase or decrease the score for each user action taken in relation to the suggested alternative domain name variation may be built into the software logic for server software 200, or may be stored as a scoring rules data record within a scoring rules data table 915.

Each data record in the scoring rules data table 915 may include, as non-limiting examples: a data field for a user action used as a means for determining the variation (e.g., "positive response/like," "negative response/dislike," "register domain name," "add domain name to shopping cart," "add domain name to favorites list," "subsequent domain selected from list", etc.), and a data field comprising a score assigned to the user action (e.g., +1, −1, etc.). Additional examples of implicit user actions may include, for example: viewing details about a domain name (e.g., +1); saving a domain name as a domain name favorite (e.g., +2); saving a suggested domain name to a shopping cart (e.g., +3); selecting an option to purchase and/or register a domain name (e.g., +4); etc. In some embodiments, implicit user input may be weighted less heavily than explicit user input, described below.

Returning to FIG. 10, if the user selects the option to provide explicit feedback for the suggested domain names, server(s) 110 may generate and render a user feedback interface specifically designed for liking and disliking each individual suggested domain name, or its individual elements. As seen in FIG. 12, the user feedback interface may include: an individual suggested alternative domain name (possibly the first domain name listed in the list of suggested alternative domain names); a price for the suggested alternative domain name; a user interface control configured to receive input from the user indicating that the user likes the domain name; a user interface control configured to receive input from the user indicating that the user dislikes the domain name; a user interface control configured to receive a request from the user to add the domain name to a favorites list; a user control configured to receive a request to add the domain name to a shopping cart; and a user control configured to receive a request to register the domain name.

In the embodiment seen in FIG. 12, a user may like or dislike each element of the domain name (e.g., each token within the SLD, the TLD, the price, the term limit etc.). In other embodiments, the user may like or dislike the domain name as a whole, and the system may determine the elements of the domain name that the user likes or dislikes as user feedback for multiple domain names is received.

In the interest of simplicity, FIG. 12 demonstrates a simplified example embodiment of a user feedback interface for a suggested alternative domain name. However, other embodiments may include variations on the user feedback interface seen in FIG. 12. For example, at any time, the user may move from user feedback input mode, as seen in FIG. 12, to a standard mode list of suggested domain names, as seen in FIG. 10.

In embodiments with a similar user interface to that shown in FIGS. 3-7, a user may access the user feedback user interface via a smart phone, tablet or other client computer capable of detecting changes to the orientation of the screen, and/or capable of detecting touch screen commands. In these embodiments, a user may access the user feedback interface by changing the orientation of the screen. Software logic may detect the change in orientation and ask the user if they would like to enter the user feedback mode. If the user indicates that they do, client(s) 120 may display the user feedback mode in the new orientation.

While in this mode, the displayed suggested domain name may respond to touch screen commands to determine the intent of the user. For example, a user may swipe the suggested domain name to the right to indicate the user likes the suggested domain name or swipe the domain name to the left to indicate that the user does not like the domain name, similar to the domain name favorites functionality described above. Additionally, the user interface may include options for a user to swipe the suggested domain name up to register the domain name, down to add the domain name to a cart, or into a designated corner to add the suggested domain name to the list of domain name favorites, as non-limiting examples.

In some embodiments (not shown), the user feedback interface may include user input controls allowing the user to indicate various degrees of liking or disliking the suggested domain name or any of its elements. In these embodiments, rather than increase or decrease the score stored in the user and/or session feedback data records 910, this score would be increased or decreased in proportion to the degrees of liking indicated by the user. For example, the user interface may include a slider indicating a percentage of liking or disliking a suggested domain name, or be sensitive to the amount of time a user has contact with a user interface control or the touch screen, so that touching the user interface control for a short period of time (or hovering a mouse over a link or control, for example) indicates liking or disliking a suggested domain name a small amount, while touching the user interface control for a longer period indicates liking or disliking a suggested domain name a greater amount. In these embodiments, the amount added to or subtracted from the score may be adjusted according to the percentage represented by the user interface.

In some embodiments, the list of suggested domain names presented (or each user feedback interface for the domain names within the list) may include an option to delete the domain name from the list altogether. In these embodiments, the system may determine that the user dislikes all variations in the suggested domain name.

For each suggested domain name, server(s) 110 may render a user interface such as that seen in FIG. 12, including any of the user feedback interface features described above. As each suggested domain name is presented to the user, the user may provide user input on their preferences. This user input related to each suggested domain name may be transmitted back to the server for processing.

Server(s) 110 may receive this user feedback input and evaluate it to determine the domain name variation features to customize for future suggested domain names within the user feedback interface for the session and/or user. Specifically, server(s) 110 may determine whether the user selected a positive response or a negative response for the variation techniques employed between the requested domain name and the suggested domain name, added the suggested domain name to favorites or a shopping cart, or requested to register the suggested domain name. Server(s) 110 may then query the scoring rules data records or logic 915, and apply software logic to determine scores to be assigned to the user action. Server(s) 110 may then execute a database query to update the score data field in each data record for the applied variation techniques represented by the suggested domain name, to reflect the positive or negative response received from the user (e.g., increase score data field by +2 for each data record storing the identified variation techniques liked by the user for the suggested alternative domain name).

Once the score data field for all user feedback data records have been updated to reflect the user feedback input for the suggested domain names, server(s) 110 may generate and/or identify the next suggested domain name to present to the user associated with the original requested domain name. This determination may be made according to a suggested domain name generated using the previously-applied variations techniques for a positive response, or one or more new variation techniques, not including the previously-applied variation technique, for a negative response.

For example, if a user initially requests the domain name phoenixbicycles.com, and is presented with a user feedback interface for phoenixcyclearizona.us (as seen in FIG. 12), individual user feedback data records may be generated and stored for each of the changes in TLD (.com to .us), ccTLD (.com to .us), synonyms for original tokens (bicycles to cycles), appended words (arizona) and appended geographical words (arizona). If the user likes all of these variations within the user feedback interface, the score for each of these user feedback records may be increased by, for example, +2. If phoenixcyclearizona.us was the first suggested domain name presented to the user within the user feedback interface, then each of the variations associated with this domain name would then have the highest score for the session and/or user.

Server(s) 110 would then use these highest scoring variation techniques to identify the next suggested domain name returned for phoenixbicycles.com, to present in the user feedback interface. In determining the next suggested domain name to present to the user, software logic may identify a suggested domain name including each of the highest scoring variations from the user feedback input (e.g., phoenixbikesaz.us).

In embodiments such as that seen in FIG. 12, each element of the suggested domain name may include its own user interface control to like or dislike an associated variation technique applied. For example, in FIG. 12, each token within the second level domain may be liked or disliked, the TLD may be liked or disliked, the price may be liked or disliked, and/or the domain name term requirement may be liked or disliked. Such an embodiment is useful in determining which variation techniques to score accordingly, or otherwise determine positive or negative responses, thereby creating a more accurate measure of elements the user likes and dislikes. However, in other embodiments where the domain is either liked or disliked as a whole, software logic may vary a single variation technique applied as it is presented in the user feedback interface to determine which features the user likes or dislikes. As more data is gathered on multiple domain names, the software logic may introduce combinations of these variation techniques applied.

The process steps from the rendering of the new domain name interface to the selection of the next highest-scored suggested domain name may be repeated for each suggested domain name, and each variation technique receiving a positive response by the user for each suggested domain name may be stored in database 130 in association with the session and/or user id.

Figure 13:
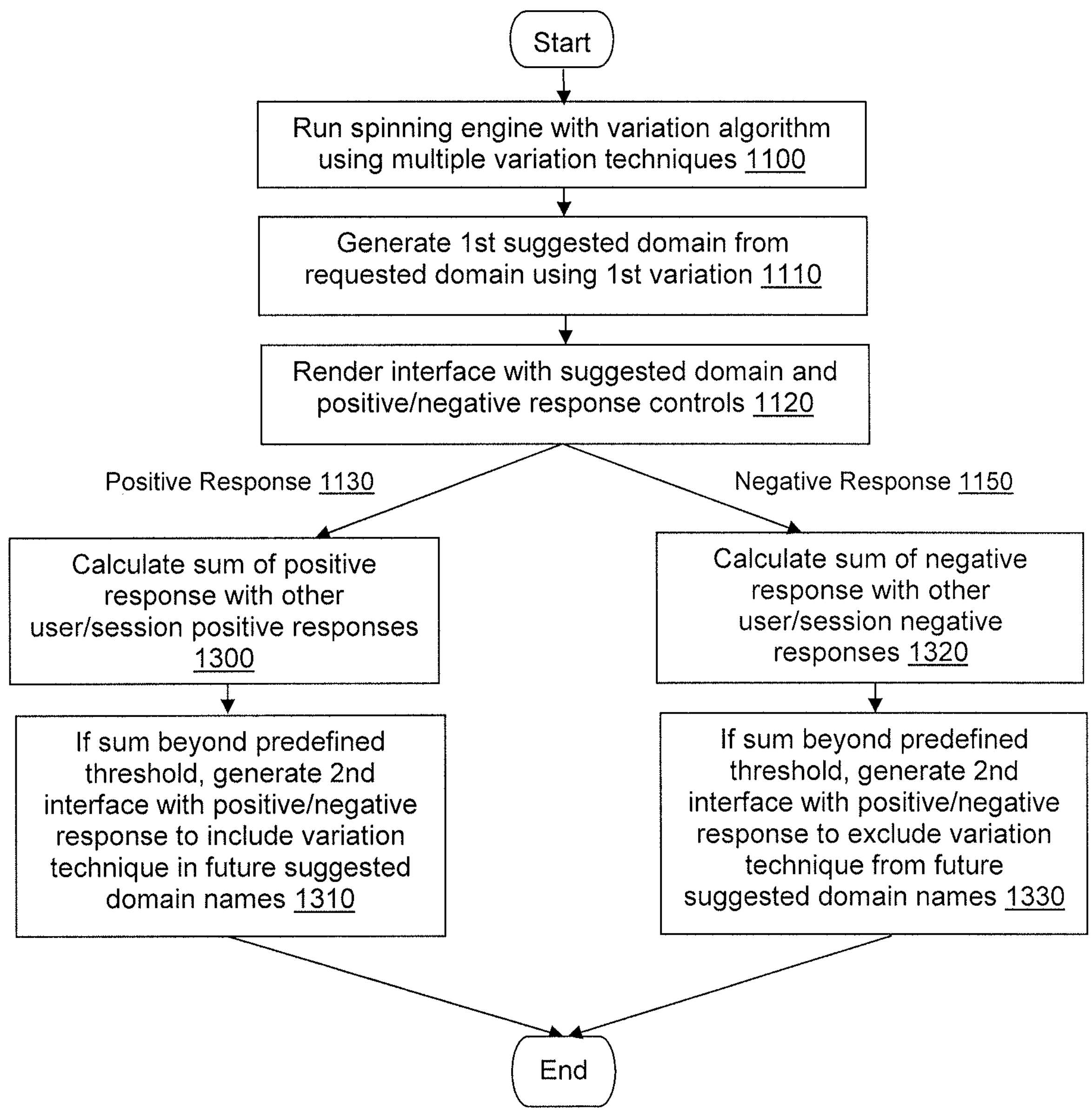
FIG. 13 is a flow diagram illustrating a possible embodiment of a method for receiving user feedback for a variation technique used on a requested domain name to generate a suggested domain name.

FIG. 13 demonstrates a flow diagram representing instructions executed by at least one processor on a server computer 110 coupled to an electronic network 100, the instructions causing the server computer 110 to execute the following method steps. In step 1100, the server computer 110 runs, within an active memory of the server computer, a domain name spin software engine 200 executing a variation algorithm using at least one of a plurality of variation techniques.

In step 1110, the server 110 generates, according to the variation algorithm, a first suggested domain name by modifying a requested domain name using a first variation technique in the plurality of variation techniques. In step 1120, the server 110 renders a user feedback interface comprising: the first suggested domain name; a first user interface control encoding a positive response to the first variation technique; and a second user interface control encoding a negative response to the first variation technique.

The server 110 transmits the user feedback interface to a client computer 120 via the electronic network and decodes a transmission received via the electronic network 100 and encoding the positive response or the negative response. In step 1130, the server computer 110 determines if the transmission encodes a positive response. In step 1300, responsive to the transmission encoding the positive response, the server computer 110 calculates a total positive sum of the positive response with at least one additional positive response associated with a user operating the client computer or associated with a domain name search session; and in step 1310, responsive to the total positive sum being beyond a positive response threshold defined in the variation algorithm, render a second user feedback interface comprising a second user interface control encoding a second positive response or a second negative response to include the first variation technique in all future suggested domain names;

In step 1150, the server computer 110 determines if the transmission encodes a negative response. In step 1320, responsive to the transmission encoding the negative response, the server computer 110 calculates a total negative sum of the negative response with at least one additional negative response associated with the user or the domain name search session; and in step 1330, responsive to the total negative sum being beyond a negative response threshold defined in the variation algorithm, render the second user feedback interface comprising the second user interface control encoding a second positive response or a second negative response to exclude the first variation technique from all future suggested domain names.

As user feedback input is received from each suggested domain name, and the score field within each of the user feedback data records is updated, software logic may determine that a collective amount of positive or negative responses, for a specific type of variation technique possibly comprising a score for that variation technique used during a session and/or associated with a session and/or user profile is above or below a predefined threshold.

For example, as seen in FIG. 14, server(s) 110 may determine that the total score for all user feedback records including a ccTLD for a particular domain search session is −12, beyond the predefined threshold of −10. In response to server(s) 110 determining that the predefined threshold has been crossed (in this case that the negative score for ccTLDs is below the negative threshold), server(s) 110 may render a user preference interface such as that seen in FIG. 14, possibly including a notification asking the user whether certain variation techniques should be consistently included in, or permanently excluded from, future suggested domain names presented in the user feedback interface.

To determine whether the predefined threshold has been reached, server(s) 110 may query the variations data records for each variation technique associated in the user feedback data records with the session and/or user profile id. For each variation type, server(s) 110 may generate a sum total of all score data fields within all data records with a data field reflecting that specific variation technique (e.g., TLD replaced with ccTLD). The sum total score for each of the specific variation techniques may then be compared with the predefined threshold for that variation type to determine if the sum total score for that variation type is above or below the predefined threshold.

For example, in the example seen in FIG. 14, after server(s) 110 receive and process the user feedback input from a suggested domain name, server(s) 110 may identify all user feedback data records 910 associated with that session or user profile id where the variation includes a variation technique where a TLD has been replaced with a ccTLD (e.g., .com with .us, .me or .co). The software logic may then sum the total of all score data fields within all returned user feedback data records 910 including ccTLD replacement. If, for example, the total of these score data fields is −11, and the predefined threshold is −10, server(s) 110 may render a user interface with a notification similar to that seen in FIG. 14, and transmit it to client(s) 120 for display.

Software logic may also identify trends in the tokens parsed from the liked or favorite domain names associated with an individual user and may recommend domain names accordingly. For example, as seen in FIG. 14 and using the examples above, server(s) 110 may run a search for common tokens in all domain names searched by a user associated with a particular id in the aggregated data, and determine that all (or a large majority of) requested, liked and favorite domain names for a user include the token "cycle." Techniques described above may be used to create domain variation records for these tokens, and score them according to the scoring rules. As described above in relation to FIG. 14, If the scores are above appropriate predefined thresholds, server(s) 110 may render a user interface notifying the user that the token(s) have appeared consistently in requested, liked and favorite domain names. The notification may then ask the user if they prefer to consistently include any identified tokens (e.g., "cycle") in all domain name recommendations going forward. Any of these method steps may apply equally with identified trends in TLDs.

The predetermined thresholds for each of the variation type data fields in the variation technique type data records 905 may be determined by a system administrator or by machine learning, and may store the predefined thresholds in a threshold rules data table 920. Data records within this threshold rules data table 920 may include, for example: a unique identification for each threshold rule, a type of domain name variation technique stored in the variation technique data field in data records in the variation technique type data table 905 and/or the user feedback data table 910, a value for each predefined threshold (e.g., −10), and/or any rules associated with the predefined threshold.

Returning now to FIG. 14, the notification displayed to the user on the user preference database may receive input from the user, confirming that the user preference is to include or exclude certain variation types in future suggested alternative domain names. For example, in FIG. 14, the notification determines that the user has associated consistent negative scores, beyond the pre-determined threshold, with ccTLDs that have replaced their requested TLD (e.g., replacing .com with .us, .me or .co). The generated notification in this example, therefore, requests confirmation from the user that any suggested domain names with a variation type including ccTLDs be excluded from future presented suggested alternative domain names. The user may provide a positive or negative response through the appropriate user interface control (e.g., checking or ignoring the provided checkbox), and the user input may be transmitted to server(s) 110 for processing.

If the user provides a positive response through the user interface control, server(s) 110 may execute a database query to generate one or more user preference data records 925 associating the session and/or user id with user preferences to include or exclude specific domain name variation types in future suggested domain names. Such a user preference data record 925 may include, for example: a unique id, a session and/or user id, a variation technique to be consistently included or excluded in future suggested alternative domain names (e.g., excluding ccTLDs). In some embodiments, the variation technique to be applied or ignored may be joined in the database with a specific variation technique data record 905.

As server(s) 110 identify a suggested domain name to include in a subsequent user feedback interface, server(s) 110 may query each user preference data record 925 comprising the user id data field associated with the user or a session id data field associated with the current session. Server(s) 110 may identify each variation technique to be included and excluded in future suggested alternative domain names for the user or session identified within the user preference data records 925, and only include/present those suggested alternative domain names to the user, possibly within the user feedback interface, that include and exclude these variation types respectively.

In embodiments such as that seen in FIG. 14, a user interface may provide a series of user interface controls allowing a user to select reasons for liking or disliking suggested alternative domain names that have crossed the pre-determined threshold. In some embodiments, these reasons may be presented generally. Users may further customize their suggested alternative domain name experience by selecting these reasons for liking or disliking particular domain names. The reasons for liking or disliking specific domain names may be stored within user preference reason data records in a user preference reasons data table 930. These user preference reasons data records may include, for example: a unique id, a reason for liking or disliking a variation technique, and one or more rules or metadata defining situations in which the reason should be displayed (e.g., associated with one or more variations/thresholds as a trigger, for example).

On receiving the feedback from the user interface controls, server(s) 110 may generate one or more data record associated with the session and/or user id. These data records may include, for example: a unique id, a session and/or user id, the suggested alternative domain name, the variation of the suggested alternative domain name, and the reason for liking or disliking the alternative domain name. Any of these data fields may be associated with the appropriate data table in the database.

The domain name search session may conclude in multiple ways. For example, a user may choose to view a list of liked domain names. For logged in users, server(s) 110 may query the database for all liked, previously searched and currently purchased domain names associated with the user. For new users that may not have a user id, or users that have not logged in, server(s) 110 may query the database for all liked domain names associated with the domain name search session, or present an optional set of feedback, which asks for randomly generated available domain names. Server(s) 110 may render a user interface, possibly the MYA or DCC interfaces, to display the results from the database query. This user interface may be transmitted to and displayed on client(s) 120. Users may select a domain name to register based on this list. The domain name search session may also be terminated by a user simply closing down the client display software.

Once the domain name search session is concluded, server(s) 110 may store all data from the domain name search session in the appropriate data records and data tables with the associated session id. For first-time users that do not have a user profile id, or users that were not logged in, these data records may be added to a general aggregation of user search data for use in the centralized data in data storage 130.

Server software 200 may use the centralized data in data storage 130 related to favorite domain names, liked/disliked domain names, domain names saved to a shopping cart, registered domain names, and/or any other domain name search session data to create a data feedback loop and analyze it according to machine learning algorithms. This data feedback loop may be designed, implemented and utilized according to any of the data feedback loop and/or machine learning algorithms disclosed in application Ser. No. 14/569,348 to Lai et al., which is incorporated in its entirety herein by reference.

As applied to the current invention, the disclosed systems and methods may collect feedback, in the form of the disclosed data for favorite domain names, liked/disliked domain names, domain names saved to a shopping cart, registered domain names, and/or any other data stored in association with domain name search sessions, from users on an ongoing basis. As new user data is received, it may be stored, aggregated and compared with general results from individual users, users in a particular geographic region, users that have associated themselves with a particular demographic (e.g., industry), any other specific user characteristics or groupings, or all users globally. This data may be continually analyzed and refined as domain name favorites are received from individual users, and/or as domain names are liked or disliked based on suggested alternative domain name variation techniques, as described above.

This refined data may benefit both individual users and domain name system administrators such as domain name registrars. As disclosed below, individual users may benefit from more customized or personalized user experiences, domain name suggestions, domain name pricing benefits, domain name suggestions specific to a user's geography, demographic or other characteristics, etc. User's may also be presented with and plan better domain name strategies based on these customized or personalized user experiences, such as receiving notice of other interested parties created through the data collected from their feedback, notice of domain names that have been liked and/or added to a favorites list of other users, and trends and strategies related to these popular domain names, including after market visibility, where a more popular liked and/or favorite domain name is showcased within higher visibility in domain name after market.

The system administrator may also benefit from the aggregation of user feedback generated through liked domain names based on variations in suggested domain names, and domain name and/or search session favorites. These benefits may include, as non-limiting examples, improvements to the quality and ranking of generated domain search result and suggestions, increased sales bundled registrations of liked and/or favorite domain names and/or greater motivation for users to register domain names that have been liked and/or added to the favorites short list, but are not being registered (via knowledge of additional interested parties in favorite and/or liked domain names). The details of these benefits are described in detail below.

Feedback data associated with liked domain names, favorite domain names and/or search sessions, on the level of individual users, users in a specific geographic area, users associated with a specific demographic, as well as the aggregation of all users generally, may be analyzed over time identifying trends, distributions, curves and/or averages across all clicks or other user input for favorite and/or liked domain name selections performed by all users.

However, in some scenarios, an individual user's selections may be too far outside the general trends, distributions, curves and/or averages to affect the aggregation of general feedback data. In these instances, the feedback data may be used to customize the user experience specifically to that user individually, or, in some instances, to a group of users associated with a particular geography or demographic. It should be noted, however, that over a duration of time, rules which might be considered specific to users could also be applied to similar users, to test/explore if those merchandising suggestions fare well for others.

The determination of the threshold between individual and general feedback data may be based on analysis of choices made by a majority of users, and outliers from this general trend. As a non-limiting example, most users may select .com results to add to their list of favorites, and/or may like domain names specifically based on a .com TLD. Because of this, when a .com version of a favorite or liked domain name (e.g., TLD.net) is available, it may be recommended to the user in the majority of cases. In another example, a user may search for a name, such as sfparkingmeter.com, and most users may be likely to add or like singular/plural versions of the TLD, such as sfparkingmeters.com. If the singular/plural version was suggested, but the customer consistently picks alternate names (e.g. Misspellings—sfparkinmeter.com, sfparkingmeeter.com, pheenixbicicles.com, etc.), that would be outside of general threshold and would be considered specific to the user.

In a final example, a user may search for a name, and most users may like or add traditional TLDs (e.g. com/net/info) to their favorites list. If a user consistently adds gTLDs/ccTLDs to their favorite list, or like them based on the gTLDs/ccTLDs, the feedback threshold would be specific to the user.

As noted above, the data returned with each liked or selected favorite domain name, and which may be used in the feedback loop, may include a domain name rank as displayed and an order in which the domain name was liked or the domain name favorite was selected relative to other liked domain names or domain name favorites. The server may compare the position of each liked or selected favorite domain names with the position of each search result/recommended domain name in the original list transmitted to the client(s) 120. The server(s) 110 may then determine that the selected domain names indicate the intent of the user that a particular domain name grabbed their attention, while the domain names before or after that domain name in the list did not grab their attention.

As a non-limiting example, users may consistently select a domain name suggestion displayed in the 5th position of a list of domain name suggestions. If the individual user, users in a particular geographic area, users in a particular demographic, or all users generally, consistently select the domain name suggestion at position 5 for that search to review details, like, add to their domain name favorites, add to a shopping cart, or register, over time, the server software 200 may determine that the result at position 5 is the most relevant, and may begin to display that result closer to the top of the list of domain name suggestions. As a result, the domain name suggestions at positions 1 2 3 and 4 will be pushed down over time.

By analogy, the clicks or other user input for liking or adding favorite domain name and/or search session selections may be similar to keywords in search engines, wherein search engines use the feedback from these keyword clicks to determine the rank in which search results will be returned and the order in which they will be displayed. Likewise, the feedback loop data for liked domain names, favorite domain names and/or search sessions, both individually and in the aggregate, may be used to change, improve and/or customize the ranking, order and/or display of domain name search results and domain name suggestions over time.

In addition to the position of the selection, additional factors may be used to determine conversion rate. As non-limiting examples, these may include: meta-type of results (traditional TLD, ccTLD, gTLD); pricing of results clicked/skipped; aftermarket results clicked/skipped; filters used by users before selecting a domain which was purchased; etc.

The server may then apply machine learning to this data as found in the application incorporated by reference above, both as applied to all aggregated data on a general user level, as well as specifically to that user, a particular geographic region, and/or to a demographic associated with the current or additional users. The server(s) 110 may then assign positive worth to the name selected and assign a negative worth (and/or a fractional negative worth) to the position of the options passed over to get to that result. Any options in the list below the selections would be ignored, since it's unclear whether the user engaged with those selections or not. The final worth of each search result/recommended domain name may determine the order of domain search results and domain name suggestions in future searches.

Thus, both generally and individually, the feedback loop data may be used to change, improve and/or customize the ranking, order and/or display of domain name search results and domain name suggestions over time.

The feedback loop data for liked and/or favorite domain names may also be applied, both individually, geographically, demographically, and/or in the aggregate, in the analysis of the quality of domain name search results and/or domain name suggestions. The keywords searched during the user's query, as well as explicit domain names relevant to the search and added to the user's domain name and/or search session favorites, may be added to the domain and/or search session liked or favorite data, both individually, geographically, demographically and/or in the aggregate, to determine domain names to be recommended in the future.

Figure 15:
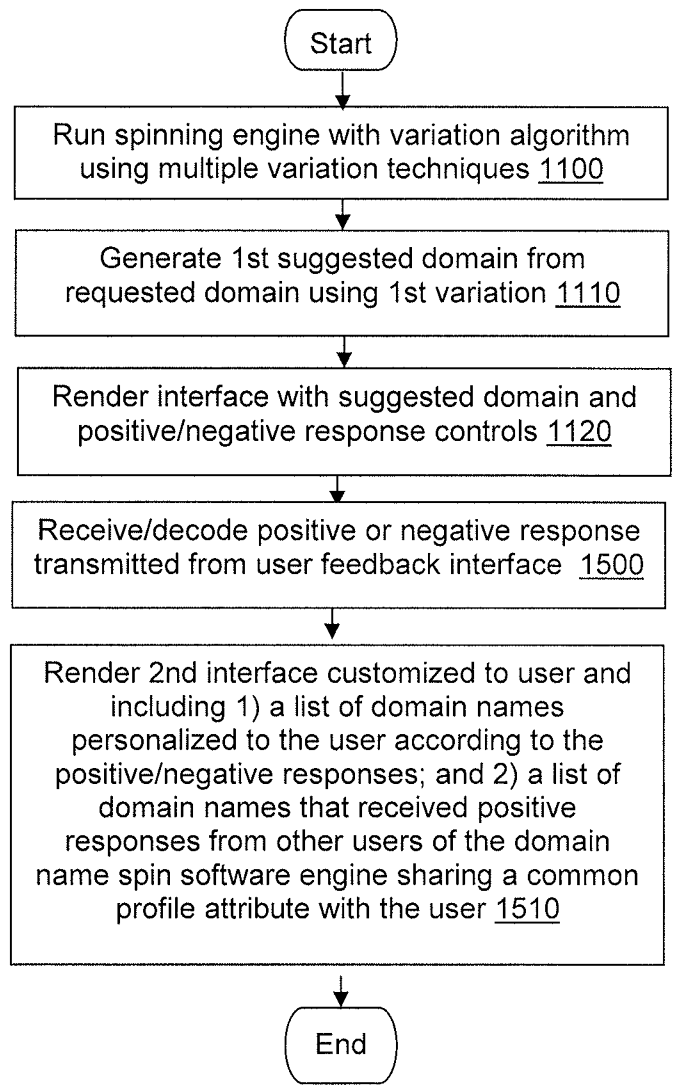
FIG. 15 is a flow diagram illustrating a possible embodiment of a method for receiving user feedback for a variation technique used on a requested domain name to generate a suggested domain name.

FIG. 15 demonstrates a flow diagram representing instructions executed by at least one processor on a server computer 110 coupled to an electronic network 100, the instructions causing the server computer 110 to execute the following method steps. In step 1100, the server computer 110 runs, within an active memory of the server computer, a domain name spin software engine 200 executing a variation algorithm using at least one of a plurality of variation techniques.

In step 1110, the server 110 generates, according to the variation algorithm, a first suggested domain name by modifying a requested domain name using a first variation technique in the plurality of variation techniques. In step 1120, the server 110 renders a user feedback interface comprising: the first suggested domain name; a first user interface control encoding a positive response to the first variation technique; and a second user interface control encoding a negative response to the first variation technique.

The server 110 transmits the user feedback interface to a client computer 120 via the electronic network and decodes a transmission received via the electronic network 100 and encoding the positive response or the negative response. In step 1500, the server decodes a transmission received via the electronic network and encoding the positive response or the negative response.

In step 1510; the server 110 renders a second user interface marketing a plurality of domain names customized to a user operating the client computer, the second user interface comprising: a recommended domain name list, each recommended domain name being personalized to the user according to the positive response or the negative response to the first variation technique; or a domain name list comprising a plurality of domain names, each domain name having received a plurality of positive responses from a plurality of users of the domain name spin software engine, each of the plurality of users sharing at least one common user profile attribute with the user.

Any user interface generated and displayed for the purpose of searching or registering domain names may be customized according to the feedback loop data associated with the users' liked or favorite domain names, either individually, geographically, demographically, or in the aggregate, customizing domain name administration, sales or other administration controls available via domain name administration control panels such as MYA or DCC. Server software 200 may be configured to generate and customize general as well was individual content on a registrar, domain name aftermarket, and/or any other relevant front of site. As a non limiting example, a user may access a user interface such as a registrar's home page, possibly the user interface shown in FIG. 16.

Specifically, the user interface for any of the disclosed server software may be configured to display to the user, the results of server method steps including: customizing domain names recommended to the user; notifying users of interest in their liked and/or favorite domain names by other users; identifying ideal price points for users generally or specifically, possibly bundling favorite domain names at or near the ideal price point, customizing domain names and sales offered via a registrar's front of site or domain name after market; notifying users of sales on domain names that they have previously identified as above their preferred price point; etc. The user interface may be personalized for a registrar website home page on a computer or mobile device, a domain registrar app, or any related domain name administration control panel such as My Account or DCC.

For example, as seen in FIG. 16, a domain name control panel may be customized to present a user with a list of customized domain names according to the variation techniques within the user's liked or favorite domain names. Each of these recommended domain names may then be registered by the user or added to a shopping cart.

As noted above, the data returned with the selected favorite domain names, or in relation to suggested domain names presented for user feedback, may include individual tokens within, or an entire SLD and a TLD of each suggested or favorite domain name. Server software 200 may be configured to identify, at both the individual, geographic, demographic and/or aggregate level, popular trends in topics related to one or more tokens identified from within the SLDs, as well as popular trends in TLDs or other domain name extensions. The software may be configured to use the feedback loop and/or machine-learning algorithms to recognize these trends and recommend future domain names accordingly. These recommended future domain names may be identified by parsing the SLD of the liked or favorite domain names selected. Any tokenization algorithms known in the art may be used to parse the SLD to identify these keywords or tokens. Software logic may then determine, from the keywords, topics of interest within the user's selections of liked or favorite domain names and/or search sessions. This logic may then determine future recommended domain names based on these topics of interest.

Similarly, recommended future domain name suggestions may be identified by TLD or other domain name extension. The feedback loop data, both individually, geographically, demographically and/or in the aggregate, may be used to recommend domain names based on TLDs or other extensions associated with liked or favorite domain names and/or search sessions. Server(s) 110 may identify the TLD and make domain name recommendations accordingly. As a non-limiting example, if a customer, no matter what other search results or suggestions are presented, is only liking or otherwise selecting favorite domain names with a .com TLD/extension, server software 200 may determine, according to the variation algorithms disclosed herein, that .coms should be presented either exclusively or more frequently to that customer, since the data suggests that is all the customer likes to register.

Similarly, server software 200 may analyze the domain name portfolios of users associated with a specific user profile id, and determine that a majority of domain names in their portfolio are .coms. In these cases, the server software 200 may be configured to use searches, liked domain names or elements (including price), additions to carts and/or purchases to understand the users' preferences. Based on those, server software 200 may be configured to suggest variations on .com names according to the variation algorithms disclosed herein (e.g., misspellings, singular/plurals, words added at the start/end, pronouns/verbs added in between, etc.), and suggest new gTLDs based on the users' price and overall relevance of theme to the .com domain names purchased (e.g. If customer profile has legal names, suggest .law, .lawyer, etc.).

In some embodiments, the software may be configured to notify customers, possibly using the notification or customization methods described below, when other customers are specifically looking for names added to their liked and/or favorites lists. To accomplish this, software may be configured according to any of the notice techniques disclosed in application Ser. Nos. 14/591,758 and 14/591,778 to Kamdar et al., which are incorporated in their entirety herein by reference.

Any notification means known in the art may be used to notify users of liked domain names, favorite domain names, sales, additional user interest, etc. Server software 200 may use the centralized domain name favorites data in data storage 130, as well as any techniques above, to alert users of other users that have the same liked and/or favorite domain names. As non-limiting examples, server software 200 may generate and transmit, based on liked and/or favorite domain name data: recommendations, email reminders, additional customer search volume, etc. to bring the customers back to the website.

As a non-limiting example seen in FIG. 16, server software 200 may be configured to calculate how many searches for each of the user's liked and/or favorite domain names have been executed in the past 30 days. The software may then be configured to notify the user that there seems to be an active interest in this name, since customers are specifically looking for it. E.g., the feedback loop data for all users in the aggregate may indicate a high number of .vegas domain name favorites and/or registrations. The registrar home page may therefore be customized to highlight sales on .vegas domain name registrations.

Alternatively, the software may be configured to calculate and notify the customer that there are, for example, 30 other customers who have added it to their favorite list, and/or 100 other customers who have liked the suggested domain name and/or the variation techniques used to generate it. Both scenarios may create an urgency, from a customer perspective, to register the domain names in their favorites list, and/or to register domain names that have used a common variation technique, or that are trending according to attributes common to the user's profile. If a customer has not purchased any names, the duration of time for which the name search would be conducted could be increased.

As seen in FIG. 16, this urgency may be used to encourage a user to register a suggested domain name or add the suggested domain name to a cart. Thus, as seen in FIG. 16, the user interface may include user interface control for each recommended domain name to register the domain name or add it to a shopping cart.

In embodiments such as that seen in FIG. 16, server(s) 110 may determine the geographic location of the requesting user in order to identify the aforementioned trends according to the user's geography. The geographic location may be determined by identifying the IP address associated with an HTTP request that requested the search of the domain name. To accomplish this, server(s) 110, possibly using logic within the server software modules 200, may identify the requesting IP address and execute a database query/lookup for data within an IP address to geographic location reference database, thereby identifying the geographic location of the IP address. The identified geographic location may be stored in association with any stored session data for the duration of the session.

Additionally, server(s) 110 may determine the user's demographic from the user's profile in order to identify the aforementioned trends. For example, identified tokens, in conjunction with demographics within the user profile database, may be used to identify an industry in association with a particular user, or use the tokens to identify an industry for a particular user. For example, a user may consistently request, like and/or select as favorites, domain names containing the tokens server, website, hosting, etc. Software logic may query a database of industry related keywords (not shown) and identify these keywords as being associated with a web developer, as seen in FIG. 16. The software logic may generate the appropriate data records, query the appropriate scoring rules and thresholds, and render a user interface with a notification, asking the user if they are a web developer. If server(s) 110 receive a positive response, future recommended/suggested alternative domain names may include keywords related to the identified industry. In FIG. 16, the system may already know that the user is a web developer, and show the trending domain names, according to liked/favorite feedback data in the web development industry.

Software on server(s) 110 may be configured to analyze this feedback loop data, both individually and in the aggregate, and customize merchandising of domain names. These merchandising opportunities may include, as non limiting examples: identifying ideal price points for users generally or specifically, possibly bundling favorite domain names at or near the ideal price point, customizing domain names and sales offered via a registrar's front of site or domain name after market; determining the highest number of favorites, by TLD and price point, more relevant to each individual user; notifying users of sales on domain names, including domain names that the user has identified as above their preferred price point; etc.

Specifically, the feedback data may be applied to determine and recommended domain names to users based on price, subject matter, TLD, price points, or additional interest in liked or favorite domain names. As noted above, the data returned with each requested, liked and/or selected favorite domain name may include a price. For example, the data returned with selected domain name favorites and/or suggested/liked domain names may include the price of each favorite or liked domain name. This, along with the other feedback loop data disclosed above, may be used to increase and personalize merchandising opportunities and user content, both in the aggregate, and for users individually.

As a non-limiting example, if the results for all liked suggested domain names and/or favorites for a user, or in the aggregate, may be priced under $15, server software 200 may be configured accordingly to customize search results and recommended domain names, both generally or to specific users, based on this $15 price point.

As another non-limiting example, if a customer selects liked and/or favorite domain names under $10, showing suggestions for names>$15 might not motivate the users to consider those names on their merit because of the price. Likewise, if a customer has never selected a premium name as a favorite or a domain name attribute liked by the user, showing suggestions for premium names as well as registry premiums (higher priced non-aftermarket names) would not be relevant to the user. If a user has a mixture of $10 and $40 names, showing names in the same range would let the users consider names on their merit. For a domain bundle, individual names may be discounted dynamically and grouped into sets of 2, 3 or 4 to incentive a user to purchase more names. Based on the customers price preferences, the discounting on the individual/overall group of names may be adjusted accordingly. Thus, if a user has added five different names to their favorite list and registers one of them, If the software determines that all five domain names are relevant to the same name which was registered based on SLD subject matter or common TLD, the software could generate a domain name bundle with each bundled domain name being set at a similar price to the registered domain name.

In some embodiments, the software may determine that the domain names saved to favorites for the user share a common SLD subject matter and/or TLD to a domain name that the user has registered. In these embodiments, to encourage the user to register the domain names currently stored as favorites, the software may calculate a price point similar to that of the registered domain name, or based on user's price point history generally. The software may then generate an offer to the user, bundling all the related favorite domain names at the calculated price point, and notify the user, thereby encouraging the user to move their liked and/or favorite domain names (or even domain names that they have previously not liked, based on price) to fully registered domain names.

The analysis of prices of liked and/or favorite domain names may be combined with the feedback loop data for SLDs and TLDs described above, and applied to determine and recommended domain names to users based on a price point. Thus, recommended domain names based on the feedback loop data associated with SLDs and TLDs may be discounted to be within the price point determined for general users or for the user individually.

In other words, if the user has specific domain names saved to their liked and/or favorite domain names, the software may use these domain names to determine domains similar to a purchased domain name and provide users with a discount on names similar to registered domain names that were originally stored as liked domain names and/or favorites. So if a user were to register a .guru name for $40, and the system determines from the feedback loop data that the user's average price spent on registering domain names is only $20, then if .guru domain names are currently on sale for $20, the software may be configured to automatically notify the customer of a sale based on domain names that the user has shown interest in which are on sale at a price point the user may be interested in, possibly using the notification means described below.

The registrar's home page or other user interface may be customized, therefore, to display the domain names that are on sale on the registrar's home page specific to that user. For example, if a particular user had several liked and/or favorite domain names that containing a .guru TLD at a particular price point (e.g., $15-$20), the sale on the registrar's home page or other user interface may note that .guru is on sale for $15 or $20 upon login to the user account. The Top N TLDs a user would consider purchasing next or the Top N next names the user might purchase would be used in conjunction with ongoing site sales to message appropriately.

The price point may be determined through the process of the user adding a domain name to a favorite list, or liking or disliking a domain name. When a customer adds a domain to their favorite list, the current price at which the domain is being offered would also be recorded. If domains are retailed on the favorite list, but not purchased, the data generated to understand price sensitivity of customers to purchasing those domains would be leverage to build future merchandising promotions. In addition, sharing the data with the registries would help them understand what customers are willing to pay for the specific TLDs v/s prices set by the registries.

The steps included in the embodiments illustrated and described in relation to FIGS. 1-16 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:

a memory, storing software instructions; and at least one processor of a server computer for communicating over a communication network with at least one computing device associated with a user from a plurality of users;

wherein, when executing the software instructions, the at least one processor is configured to:

receive, from the at least one computing device associated with the user, a domain name request, from the user, to register or search a requested domain name;

initiate a domain name search session, based on the domain name request;

within the domain name search session: communicate with at least one electronic resource to determine availability or unavailability of the requested domain name to be registered;

determining the requested domain name is unavailable to be registered; in response to determining the requested domain name is unavailable to be registered:

execute a domain name spin engine to modify the requested domain name using at least one variation technique to obtain at least one suggested domain name;

instruct, over the communication network, the at least one computing device to generate a first user interface for display to the user on the at least one computing device;

wherein the first user interface comprises:

(i) the at least one suggested domain name and (ii) at least one user interface control, configured to allow the user to perform at least one feedback action in relation to the at least one suggested domain name;

receive, from the at least one computing device and over the communication network, feedback action metadata of the at least one feedback action performed by the user in relation to the at least one suggested domain name;

re-execute the domain name spin engine to tokenize and modify the at least one suggested domain name to obtain at least one suggested alternative domain name, comprising a plurality of tokens, based at least in part on:

i) the at least one variation technique and ii) the feedback action metadata; and instruct, over the communication network, the at least one computing device to generate a user feedback interface for display to the user on the at least one computing device, wherein the user feedback interface comprises of:

i) the plurality of tokens of the at least one suggested alternative domain name and ii) a plurality of user interface controls configured to allow the user to perform at least two different feedback actions, wherein each feedback action is related to a particular token of the plurality of tokens of the at least one suggested alternative domain name.

2. The system according to claim 1, further comprising a database, and wherein the database stores aggregate data of positive responses, negative responses, or both, for each user of the plurality of users.

3. The system according to claim 1, wherein the at least one processor is further configured to order the plurality of domain names based on the response by the user to the at least one suggested domain name.

4. The system according to claim 1, wherein the at least one processor is further configured to personalize the plurality of domain names for the user based on at least one of:

(i) a token with a second level domain name of the at least one suggested domain name, or (ii) a top-level domain name of the at least one suggested domain name.

5. The system according to claim 1, wherein the first user interface comprises a plurality of user interface controls, configured to allow the user to perform a plurality of different feedback actions in relation to the particular token of the plurality of tokens of the at least one suggested domain name.

6. The system according to claim 5, wherein, when executing the software instructions, the at least one processor is further configured to:

score, based on the feedback action metadata and at least one scoring rule, the at least one feedback action to assign at least one score; and execute the domain name spin engine to modify the particular token of the plurality of tokens of the at least one suggested domain name to obtain the at least one suggested alternative domain name, further based on the at least one score assigned to the at least one feedback action.

7. The system according to claim 5, wherein, when executing the software instructions, the at least one processor is further configured to:

execute the domain name spin engine to tokenize and modify the plurality of tokens of the at least one suggested domain name to obtain the particular token of the plurality of tokens of the at least one suggested alternative domain name, further based on other feedback action metadata of at least one other feedback action performed by at least one other user in relation to a different token of the plurality of tokens of at least one other suggested domain name during at least one other domain name search session.

8. The system according to claim 5, wherein the plurality of user interface controls comprises at least two of:

i) at least one first user interface control, configured to allow the user to identify when the use likes or dislikes at least one part of the particular token of the plurality of tokens of the at least one suggested domain name, ii) at least one second user interface control, configured to allow the user to add the particular token of the plurality of tokens of the at least one suggested domain name to a shopping cart, iii) at least one third user interface control, configured to allow the user to save the particular token of the plurality of tokens of the at least one suggested domain name as a domain name favorite, iv) at least one fourth user interface control, configured to allow the user to purchase the particular token of the plurality of tokens of the at least one suggested domain name, and v) at least one fifth user interface control, configured to allow the user to register the particular token of the plurality of tokens of the at least one suggested domain name.

9. The system according to claim 1, wherein, when executing the software instructions, the at least one processor is further configured to assign a unique identifier to the domain name search session.

10. A method, comprising:

receiving, by at least one processor of a computing device associated with a user, a domain name request, from the user, to register or search a requested domain name, initiating a domain name search session, based on the domain name request, within the domain name search session:

communicated with at least one electronic resource to determine availability or unavailability of the requested domain name to be registered, determining the requested domain name is unavailable to be registered; in response to determining the requested domain name is unavailable to be registered:

executing, by the at least one processor of the computing device associated with the user, a domain name spin engine to modify a domain name using at least one variation technique to obtain at least one suggested domain name, wherein the at least one computing device associated with the user communicates over a communication network with at least one server computer;

instructing, over the communication network, the at least one computing device to generate, a first user interface for display to the user on the at least one computing device;

wherein the first user interface comprises:

i) the at least one suggested domain name and ii) at least one user interface control, configured to allow the user to perform at least one feedback action in relation to the at least one suggested domain name;

receiving, from the at least one computing device and over the communication network, feedback action metadata of the at least one feedback action performed by the user in relation to the at least one suggested domain name;

re-executing the domain name spin engine to tokenize and modify the at least one suggested domain name to obtain at least one suggested alternative domain name, comprising a plurality of tokens, based at least in part on:

i) the at least one variation technique and ii) the feedback action metadata, and instructing, over the communication network, the at least one computing device to generate, a user feedback interface for display to the user on the at least one computing device, wherein the user feedback interface comprises:

i) the plurality of tokens of the at least one suggested alternative domain name and ii) a plurality of user interface controls configured to allow the user to perform at least two different feedback actions, wherein each feedback action is relation to a particular token of the plurality of tokens of the at least one suggested alternative domain name.

11. The method according to claim 10, further comprising storing, by the at least one processor, aggregate data of positive responses, negative responses, or both, for each user of the plurality of users in a database.

12. The method according to claim 10, further comprising ordering, by the at least one processor, the plurality of domain names based on the positive response and the negative response to the at least one suggested domain name.

13. The method according to claim 10, further comprising personalizing, by the at least one processor, the plurality of domain names for the user based on at least one of:

(i) a token with a second level domain name of the at least one suggested domain name; or (ii) a top-level domain name of the at least one suggested domain name.

14. The method according to claim 10, wherein the first user interface comprises a plurality of user interface controls, configured to allow the user to perform a plurality of different feedback actions in relation to the particular token of the plurality of tokens of the at least one suggested domain name.

15. The method according to claim 14, wherein, when executing the software instructions, the at least one processor is further configured to:

scoring, based on the feedback action metadata and at least one scoring rule, the at least one feedback action to assign at least one score; and executing the domain name spin engine to modify the particular token of the plurality of tokens of the at least one suggested domain name to obtain the at least one suggested alternative domain name, further based on the at least one score assigned to the at least one feedback action.

16. The method according to claim 14, wherein, when executing the software instructions, the at least one processor is further configured to:

executing the domain name spin engine to tokenize and modifying the plurality of tokens of the at least one suggested domain name to obtain the particular token of the plurality of tokens of the at least one suggested alternative domain name, further based on other feedback action metadata of at least one other feedback action performed by at least one other user in relation to a different token of the plurality of tokens of at least one other suggested domain name during at least one other domain name search session.

17. The method according to claim 14, wherein the plurality of user interface controls comprises at least two of:

i) at least one first user interface control, configured to allow the user to identify when the use likes or dislikes at least one part of the particular token of the plurality of tokens of the at least one suggested domain name, ii) at least one second user interface control, configured to allow the user to add the particular token of the plurality of tokens of the at least one suggested domain name to a shopping cart, iii) at least one third user interface control, configured to allowing the user to save the particular token of the plurality of tokens of the at least one suggested domain name as a domain name favorite, iv) at least one fourth user interface control, configured to allow the user to purchase the particular token of the plurality of tokens of the at least one suggested domain name, and v) at least one fifth user interface control, configured to allow the user to register the particular token of the plurality of tokens of the at least one suggested domain name.

18. The method according to claim 10, wherein, when executing the software instructions, the at least one processor is further configured to assigning a unique identifier to the domain name search session.

* * * * *